US006841284B2

(12) United States Patent
Brown et al.

(10) Patent No.: US 6,841,284 B2
(45) Date of Patent: Jan. 11, 2005

(54) HORIZONTAL FUEL CELL TUBE SYSTEM AND METHODS

(75) Inventors: Michael Brown, Cambridge, MA (US); Basil Fenton, Norwood, MA (US); Kevin Gaw, Canton, MA (US); Neil Fernandes, Cambridge, MA (US); Gary A. Mook, Westwood, MA (US); Hugh L. Smith, Canton, MA (US); Geoffrey Tompsett, Amherst, MA (US); Caine Finnerty, Cannock (GB); Anthony F. Litka, Hanover, MA (US); Virginie Bouvier, Medford, MA (US); Kevin H. Negrotti, Waltham, MA (US)

(73) Assignee: Acumentrics Corporation, Westwood, MA (US)

(*) Notice: Subject to any disclaimer, the term of this patent is extended or adjusted under 35 U.S.C. 154(b) by 0 days.

(21) Appl. No.: 10/162,432

(22) Filed: Jun. 4, 2002

(65) Prior Publication Data

US 2003/0203263 A1 Oct. 30, 2003

(Under 37 CFR 1.47)

Related U.S. Application Data

(60) Provisional application No. 60/295,938, filed on Jun. 4, 2001, and provisional application No. 60/352,823, filed on Jan. 30, 2002.

(51) Int. Cl.[7] ............................................... H01M 8/12
(52) U.S. Cl. .............................. 429/31; 429/32; 429/35
(58) Field of Search .............................. 429/30, 31, 32, 429/33, 34, 35, 36

(56) References Cited

U.S. PATENT DOCUMENTS

| 5,082,751 A | * | 1/1992 | Reichner .................. 429/30 X |
| 5,273,839 A | * | 12/1993 | Ishihara et al. .............. 429/34 |
| 5,492,777 A | * | 2/1996 | Isenberg et al. .......... 429/30 X |
| 5,985,113 A | | 11/1999 | Crome et al. ............... 204/286 |
| 6,033,632 A | | 3/2000 | Schwartz et al. ........... 422/190 |
| 6,379,831 B1 | * | 4/2002 | Draper et al. ................. 429/31 |
| 6,416,897 B1 | * | 7/2002 | Tomlins et al. ............... 429/31 |
| 6,656,623 B2 | * | 12/2003 | Holmes et al. ............... 429/30 |

FOREIGN PATENT DOCUMENTS

| JP | 01267963 | 10/1989 | ............ H01M/8/12 |
| JP | 01320773 | 12/1989 | ............ H01M/8/04 |
| JP | 04292866 | 10/1992 | ............ H01M/8/24 |
| JP | 2000182652 | 6/2000 | ............ H01M/8/24 |

* cited by examiner

Primary Examiner—Stephen J. Kalafut
(74) Attorney, Agent, or Firm—Bromberg & Sunstein LLP

(57) ABSTRACT

In one disclosed embodiment according to the invention, a fuel cell system for generating electrical power comprises: an open-ended tubular solid oxide fuel cell; a first fuel injector tube extending from a first fuel plenum chamber through one open end of the fuel cell; and a second fuel injector tube extending from a second fuel plenum chamber through another open end of the fuel cell; wherein the first and second fuel injector tubes form a gap within the fuel cell from which a hydrogen-containing fuel gas may flow towards the open ends of the fuel cell. Further related systems and method are also disclosed.

33 Claims, 45 Drawing Sheets

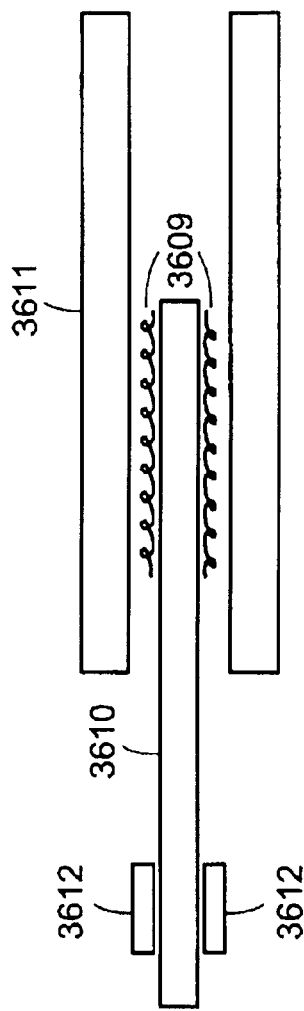
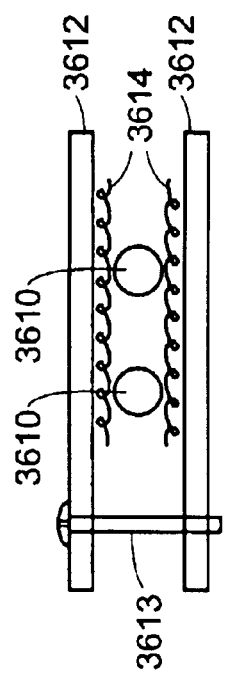
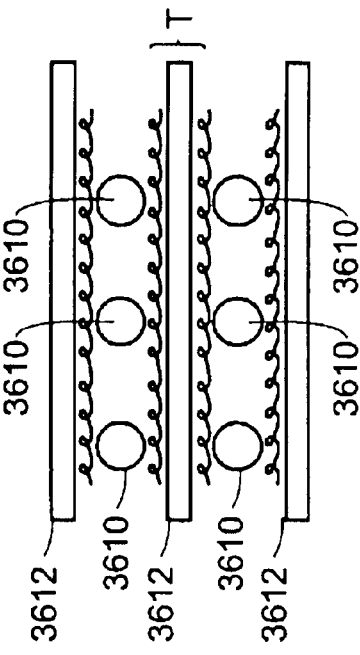
FIG. 36A
FIG. 36B
FIG. 36C

HORIZONTAL FUEL CELL TUBE SYSTEM AND METHODS

CROSS-REFERENCE TO RELATED APPLICATION

This application claims the benefit of our provisional application Ser. No. 60/295,938, filed Jun. 4, 2001, and of our provisional application Ser. No. 60/352,823, filed Jan. 30, 2002. The disclosures of both of these related applications are hereby incorporated herein by reference.

TECHNICAL FIELD

The invention relates to fuel cell systems and associated methods, and in particular to fuel cell stack designs for tubular solid oxide fuel cells.

BACKGROUND ART

Worldwide forecasts show electricity consumption increasing dramatically in the next decades, largely due to economic growth in developing countries that lack national power grids. This increased consumption, together with the deregulation of electrical utilities in industrialized nations, creates the need for small scale, distributed generation of electricity.

Fuel cells are a promising technology for providing distributed generation of electricity. A fuel cell places an oxidizing gas, such as air, and a hydrogen-containing fuel, such as hydrogen or natural gas, on opposite sides of an electrolyte in such a way that they combine to form water and electricity. Such a reaction requires a cathode and an anode composed of porous materials, and an ionically-conducting electrolyte. In solid oxide fuel cells, the electrolyte conducts negatively-charged oxygen ions.

Solid oxide fuel cell systems can be made less expensively than other kinds of fuel cells, and thus have particular potential for facilitating distributed power generation. Important concerns in designing solid oxide fuel cell systems include ease of fabrication, ability to form series and parallel electrical connections to the fuel cells, and reliability of fuel cell seals.

SUMMARY OF THE INVENTION

In one embodiment according to the invention, a fuel cell system for generating electrical power comprises: an open-ended tubular solid oxide fuel cell; a first fuel injector tube extending from a first fuel plenum chamber through one open end of the fuel cell; and a second fuel injector tube extending from a second fuel plenum chamber through another open end of the fuel cell; wherein the first and second fuel injector tubes form a gap within the fuel cell from which a hydrogen-containing fuel gas may flow towards the open ends of the fuel cell.

In further related embodiments, at least one of the fuel plenum chambers contains a pre-reformation catalyst. The open ends of the fuel cell may extend through first and second combustion manifolds bounding first and second combustion zones, while the first fuel injector tube extends through the first combustion zone, and the second fuel injector tube extends through the second combustion zone. The fuel cell may be an anode-supported tubular fuel cell. A bundle of a plurality of electrically-parallel tubular solid oxide fuel cells may be mounted between an opposing pair of fuel plenum chambers, with opposing pairs of first and second fuel injector tubes extending into each fuel cell of the bundle. A plurality of bundles of fuel cells may be electrically connected in series, and a plurality of adjoining fuel plenum chambers may be electrically insulated by partitions. The system may comprise a ceramic heating tube. At least one of the fuel plenum chambers may comprise at least two oppositely-facing sets of fuel injector tubes. A fuel inlet for the first fuel plenum chamber may enter from an opposite side of the system from a fuel inlet for the second fuel plenum chamber. A gas burner may be positioned to heat an enclosure surrounding a cathode zone of the system. The fuel cell may comprise a plurality of fuel cell segments. The first and second fuel injector tubes may be electrically connected with an anode layer of the fuel cell.

In further related embodiments, the first combustion manifold, which may be made of ceramic fiberboard, forms a seal around the fuel cell. The seal may be formed by compressing the ceramic fiberboard. A stack of a plurality of such layers may be formed, with electrically-parallel fuel cell bundles being electrically insulated from each other. Ceramic fiber blanket material may be used to electrically insulate the layers. The first combustion manifold may be separated into two combustion zones, which may correspond to electrically insulated halves of the first fuel plenum chamber.

In another embodiment according to the invention, a fuel cell system for generating electrical power comprises: a plurality of open-ended tubular solid oxide fuel cells positioned horizontally between a fuel inlet plate and a fuel outlet plate; wherein the fuel inlet plate and the fuel outlet plate comprise a series of openings for the fuel cells, and each comprise a compressed layer of ceramic fiberboard that forms a seal around each of the fuel cells. Such an embodiment may comprise a gas burner positioned to heat an enclosure surrounding a cathode zone of the system, or a fuel pre-treatment module; and the fuel inlet plate and fuel outlet plate may comprise flanges for modular assembly of the fuel cell system.

In a further embodiment according to the invention, a fuel cell system for generating electrical power comprises: a plurality of vertically-stacked fuel cell layers, each layer comprising a plurality of open-ended tubular solid oxide fuel cells positioned horizontally between two ceramic fiberboard fuel plenums and placed electrically in parallel; wherein each layer of the plurality of layers is electrically insulated from neighboring layers.

In another embodiment according to the invention, a method of forming a seal around a tubular solid oxide fuel cell comprises: inserting the fuel cell through at least three seal layers, the seal layers comprising first and second metal plate layers and a ceramic fiberboard layer; and compressing the ceramic fiberboard layer between the metal plates to form a seal around the fuel cell.

In a further embodiment according to the invention, a fuel cell system for generating electrical power comprises: a plurality of open-ended tubular solid oxide fuel cells positioned horizontally between a top half and a bottom half of a ceramic manifold; wherein the ceramic manifold forms a seal around the ends of the fuel cells, and wherein an opening at one end of the ceramic manifold forms an inlet manifold, and an opening at the other end of the ceramic manifold forms an outlet manifold. The ceramic manifold may comprise openings for a plurality of bundles of electrically parallel fuel cells, and at least two bundles of fuel cells within the ceramic manifold may be electrically connected in series. An anode current collection system of the fuel cell system may comprise a set of anode wires sandwiched between a pair of bus bars, and the system may further comprise at least one ceramic tube surrounding a current collection wire.

In another embodiment according to the invention, a fuel cell system for generating electrical power comprises: a plurality of vertically-stacked fuel cell layers, each layer comprising a plurality of open-ended tubular solid oxide fuel cells positioned horizontally between a ceramic exhaust plenum and a metal fuel input manifold; wherein the fuel input manifold comprises projections for electrically connecting each fuel cell layer to a next layer above it, and wherein a corrugated current collector for each layer makes a snap fit with the plurality of fuel cells of the layer. A heat exchanger may be positioned to store heat from outgoing air from the system and to warm incoming air. The system may further comprise at least one heating pipe extending through the exhaust plenum.

BRIEF DESCRIPTION OF THE DRAWINGS

The foregoing features of the invention will be more readily understood by reference to the following detailed description, taken with reference to the accompanying drawings, in which:

FIG. 14 shows a stack of layers of the embodiment of FIG. 13, with electrically insulating layers between;

FIG. 17 shows ten layers of the embodiment of FIG. 16, stacked on top of each other with electrically insulating layers between;

FIGS. 36A, 36B and 36C show components for current collection from the anode of a tubular fuel cell, in accordance with an embodiment of the invention;

DETAILED DESCRIPTION OF SPECIFIC EMBODIMENTS

Figure 1:
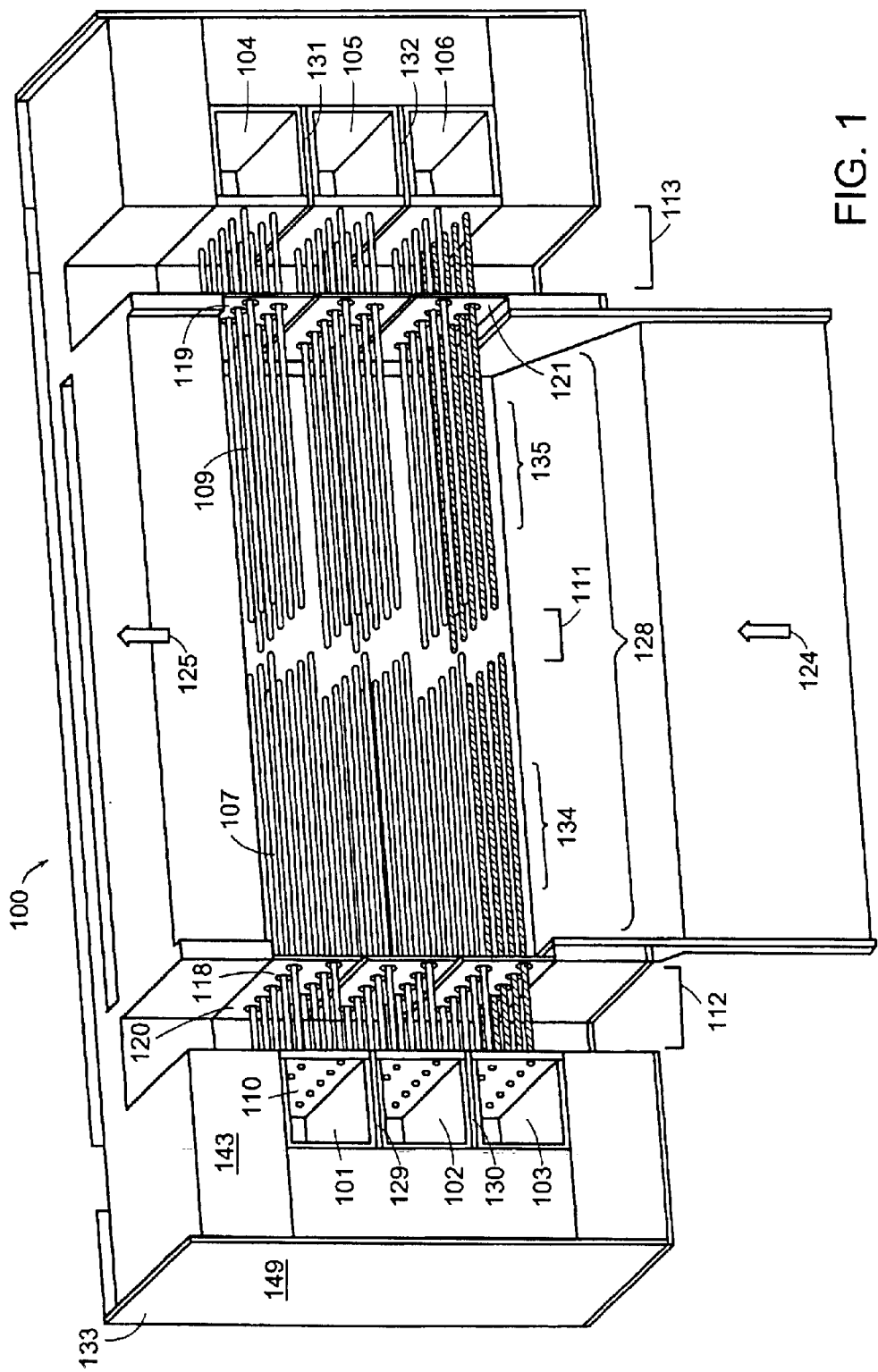
FIG. 1 shows a cross-sectional view of a dual injector tubular fuel cell system according to an embodiment of the invention.

FIG. 1 shows a cross-sectional view of a dual injector tubular fuel cell system 100 according to an embodiment of the invention. In this embodiment, a hydrogen-containing fuel gas, such as natural gas, flows into two sets of fuel plenum chambers 101–103 and 104–106 located on opposite sides of system 100. After being pre-reformed in the fuel plenum chambers, the fuel gas flows out of each fuel plenum chamber 101–106 through a fuel gas injector 107, and toward the center of system 100. Each fuel gas injector 107 is a metal tube (such as a steel tube) affixed at its base (for instance, by welding) to a hole 110 in the wall of a fuel plenum chamber 101.

Figure 2:
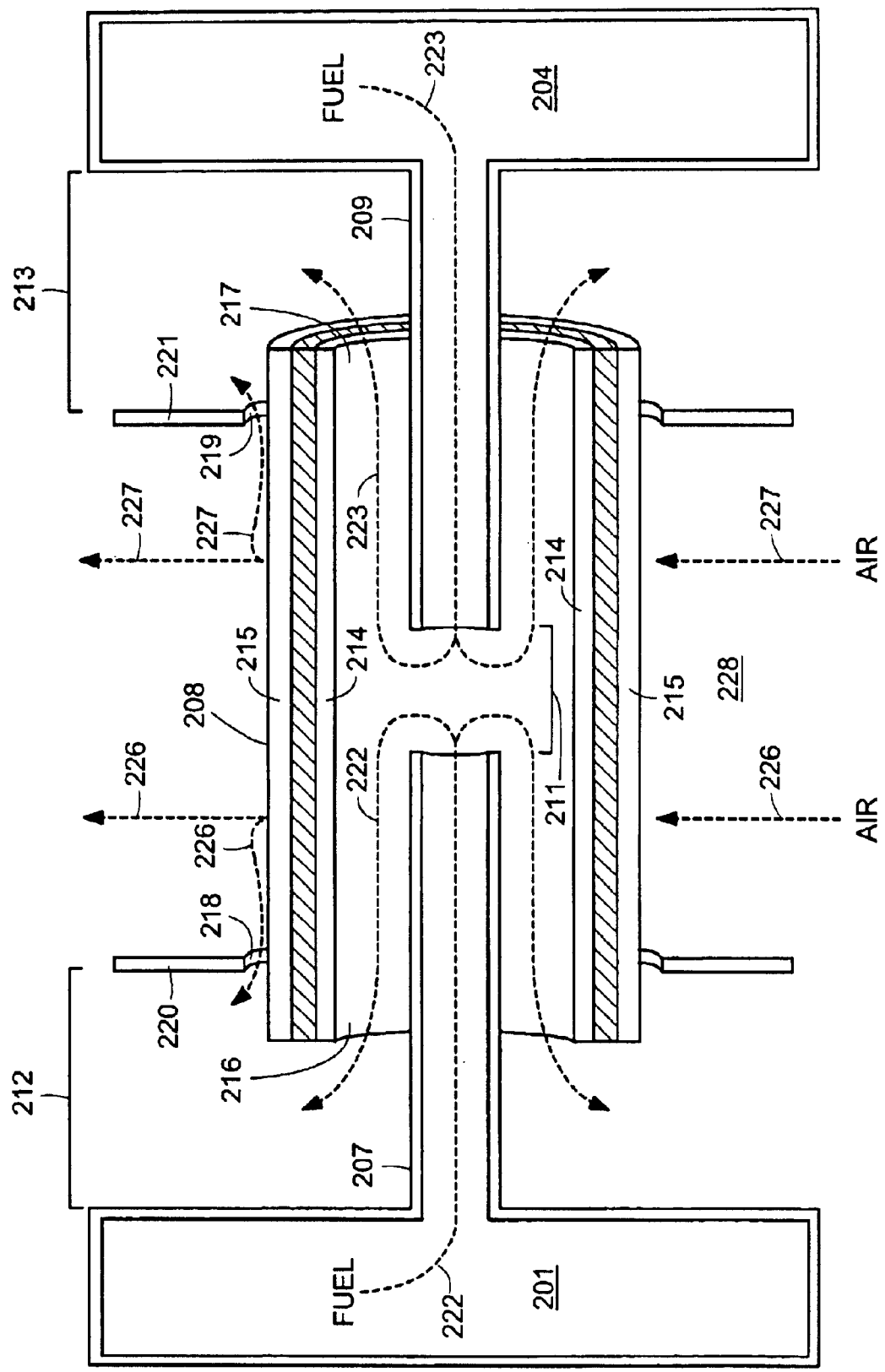
FIG. 2 shows a cross-sectional detail view of a tubular solid oxide fuel cell surrounding an opposing pair of fuel gas injectors, in accordance with an embodiment of the invention.

A tubular solid oxide fuel cell 208 (omitted from FIG. 1 for clarity) surrounds each opposing pair of fuel gas injectors 207, 209, as shown in the cross-sectional detail view of FIG. 2. Dashed lines 222 and 223 indicate the flow of fuel gas: first, in opposite directions away from a gap 211, that is between the ends of opposing fuel gas injectors 207, 209; then along the inside of fuel cell tube 208; and then into combustion zones 212, 213 that are located at each end of system 100. Fuel cell tube 208 has an inner anode layer 214 and an outer cathode layer 215; and is used with its open ends 216, 217 extending through holes 218, 219 in combustion manifolds 220, 221. In FIG. 1, analogous numerals (111, 107, 109 etc.) indicate analogous items to those of FIG. 2 (such as items 211, 207, 209, etc.).

Air (or another source of oxygen gas) enters the bottom of cathode zone 128 through air inlet 124; rises around the external, cathode surface of the fuel cell tubes 208; and exits through air outlet 125. Air also enters the bottom of combustion zones 112 and 113 through separate inlets, and rises out the top of those compartments. Dashed lines 226 and 227 in FIG. 2 indicate the flow of air through the cathode zone 228. In one embodiment, holes 218 and 219 are slightly larger than the outside diameter of fuel cell tube 208, and thus permit some air to be drawn from cathode zone 228 into the combustion zones 212 and 213. Preferably, however, gaps between the edges of holes 218, 219, and the outer surface of fuel cell 208 are sealed, to prevent combustion gases from flowing out of the combustion zones into the cathode zone 128. Such a seal may be formed, for example, using ceramic fiberboard, in accordance with an embodiment described below; or may be formed using other sealing techniques.

Apart from its inlets and outlets, system 100 is enclosed by a thermally insulating enclosure 133, which may be made, for example, of a layer of steel 149 on the sides, surrounding a thicker layer of ceramic fiberboard 143 on the sides, top, and bottom.

By reacting hydrogen from the fuel gas with oxygen from the air, each fuel cell 208 produces electricity. In accordance with one embodiment of the invention, the fuel cells 208 are anode-supported tubular fuel cells, such as those disclosed in a co-pending U.S. patent application Ser. No. 09/864,070, filed May 22, 2001, entitled "Electrode-supported Solid State Electrochemical Cell"; and in its related U.S. Provisional Application Ser. No. 60/206,456, filed May 22, 2000, entitled "Anode-supported Tubular Fuel Cell." The disclosures of both of these applications are hereby incorporated herein by reference. In accordance with alternative embodiments, the fuel cells are electrolyte-supported tubular fuel cells, or cathode-supported tubular fuel cells, or other forms of fuel cells.

In accordance with the embodiment of FIG. 1, the fuel plenum chambers are divided into two sets, such as set 101–103 and set 104–106. Each set is divided into separate, electrically insulated fuel plenum chambers (such as chambers 101, 102, 103) by partitions 129, 130 and 131, 132. Between each of the opposing pairs of fuel plenum chambers (such as pairs 101/104, 102/105, and 103/106) a bundle of tubular fuel cells is mounted on dual injectors (such as fuel cell 208 on injectors 207 and 209) so that the fuel cells are electrically in parallel. Partitions 129, 130 and 131, 132 electrically insulate these layers of parallel bundles from each other so that the bundles may be placed electrically in series. Thus, for example, system 100 of FIG. 1 allows use of three fuel cell bundles in series, with each bundle containing ten tubular cells connected in parallel. Alternative embodiments create different numbers of cell bundles by using more or less plenum partitions. Another embodiment has no partitions 129–132, and thus has only one bundle of fuel cells mounted in parallel between two non-partitioned fuel plenums.

In one embodiment according to the invention, at least one bottom layer of injectors 134, 135 (shown in black for clarity) is surrounded by ceramic heating tubes that extend from one opposing injector to another, in a similar fashion to fuel cell tube 208. Such ceramic heating tubes contain a combustion catalyst, and reach a high temperature by catalytic combustion. Air entering cathode zone 128 and passing over these tubes is thus heated before it reaches the cathodes 215 of fuel cells 208.

Fuel plenum chambers 101–103 and 104–106 contain a pre-reforming catalyst; for example, they may contain loosely-packed porous ceramic balls coated with ruthenium. Heat is transferred from combustion zones 112 and 113 to fuel in the plenum chambers 101–103 and 104–106 (thereby assisting the pre-reformation reaction), and to fuel traveling inside the injectors through the combustion zones.

Figure 3:
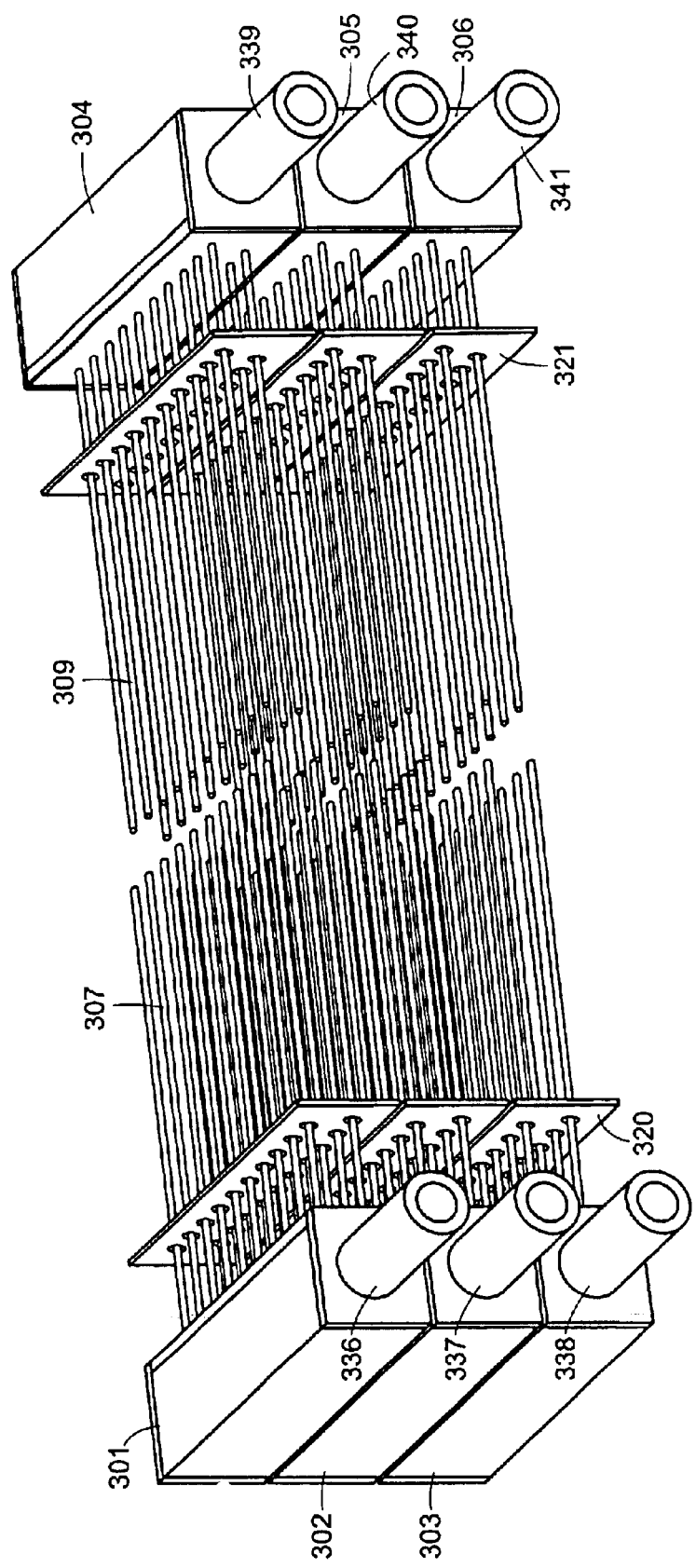
FIG. 3 shows a view of the fuel plenum chambers, injectors, and combustion manifolds of the embodiment of FIG. 1, with other elements omitted for clarity.

FIG. 3 shows a view of the fuel plenum chambers, injectors, and combustion manifolds in accordance with an embodiment of the invention, with other elements omitted for clarity. Each separate fuel plenum chamber 301–306 has its own fuel inlet, 336–341.

Figure 4:
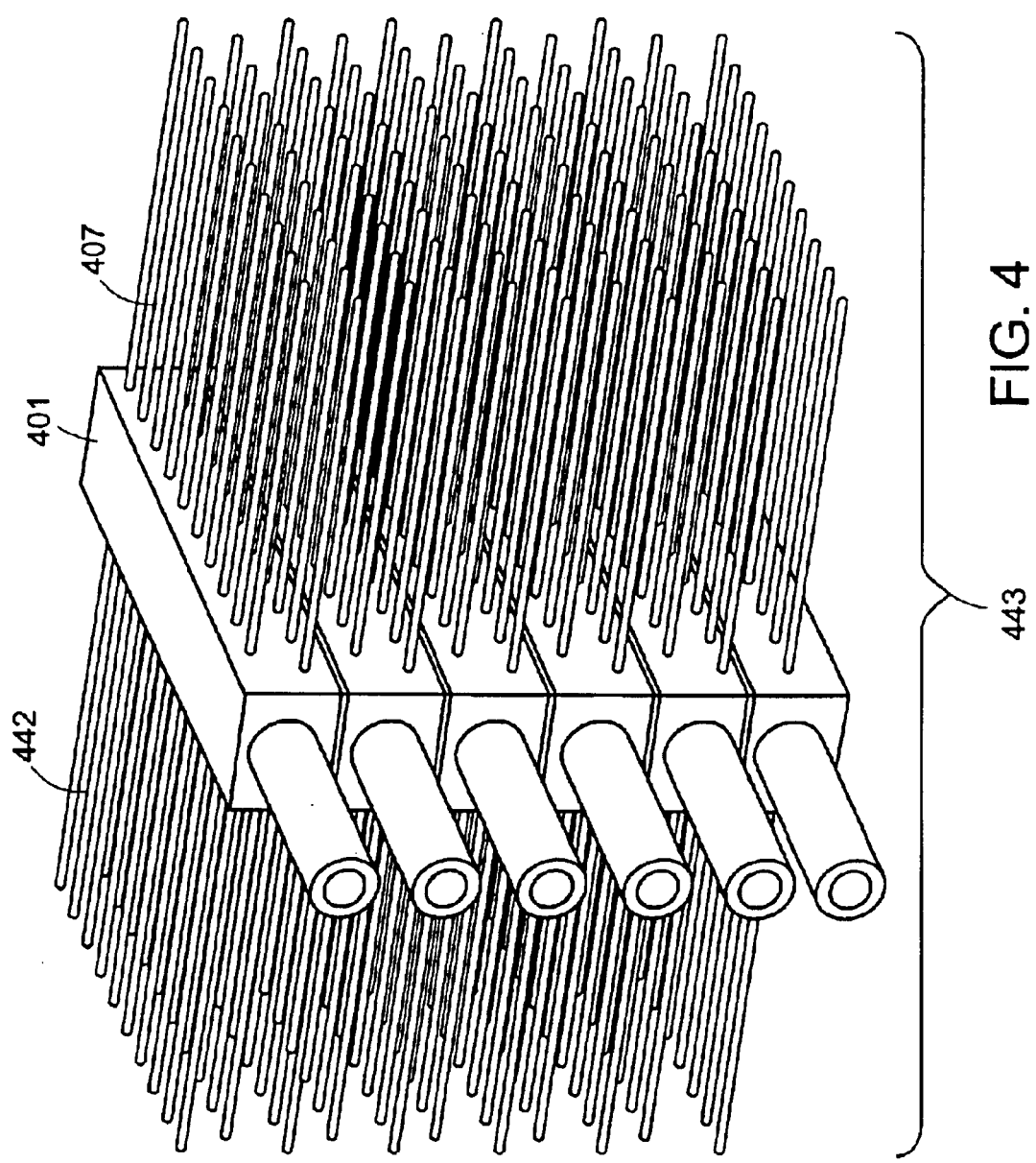
FIG. 4 shows a set of fuel plenum chambers having fuel gas injectors extending from both of their side walls, in accordance with an embodiment of the invention.

FIG. 4 shows a set of fuel plenum chambers 401 having fuel gas injectors 407 and 442 extending from both of their side walls, in accordance with an embodiment of the invention. Arranging several assemblies 443 in a repeated fashion side by side allows improved packing efficiency of fuel cells as compared with the embodiment of FIG. 1, by replicating the arrangement of system 100 in a lengthwise direction. That is, the embodiment of FIG. 4 allows assembly of repeating arrays (each array composed of: fuel plenum chambers/right-facing injector/left-facing injector/fuel plenum chambers) to create a single system that continues lengthwise as long as desired (with a single-sided injector assembly at each of the two ends of the system). Fuel cells arranged on injectors on opposite sides of a fuel plenum chamber (such as injectors 407 and 442) are electrically in parallel, in such a lengthwise array.

Figure 5:
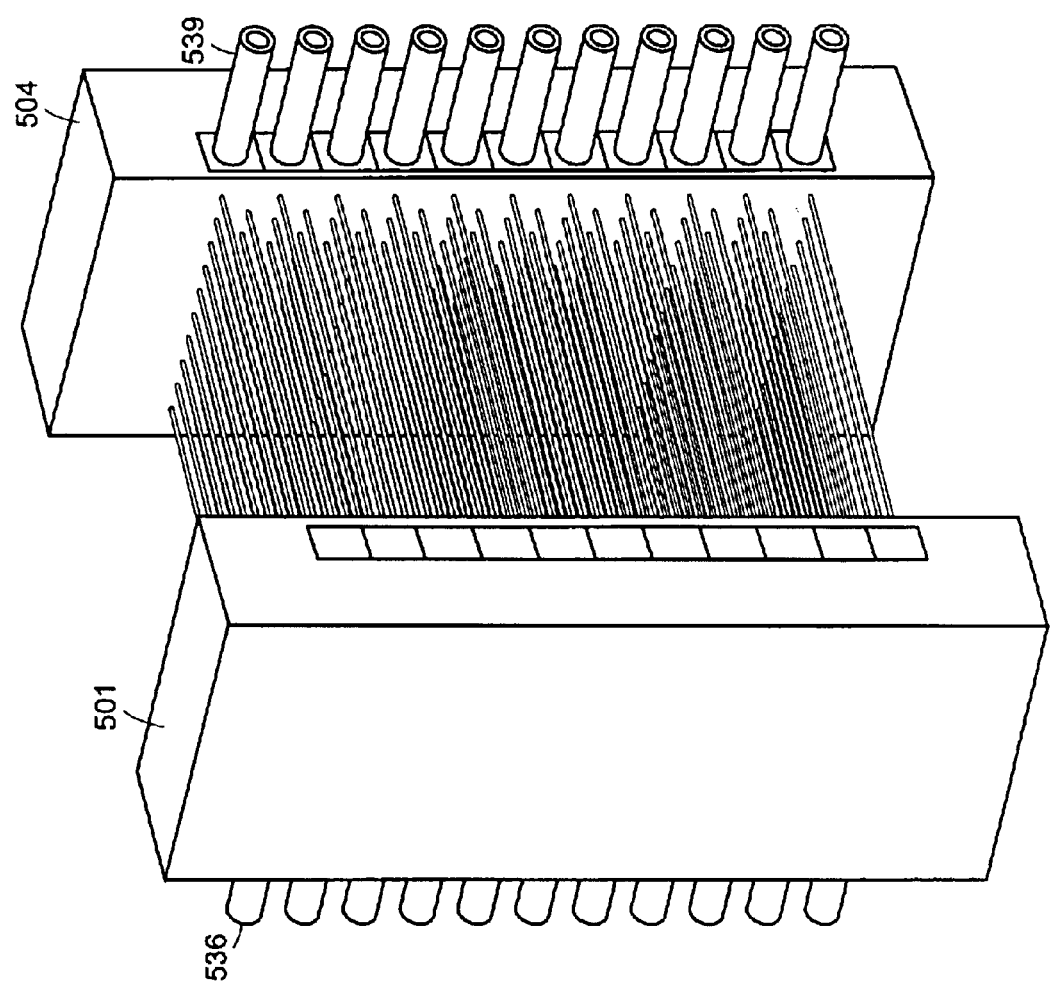
FIG. 5 shows two facing sets of fuel plenum chambers in which the fuel inlets enter from opposite sides, in accordance with an embodiment of the invention.

FIG. 5 shows two facing sets of fuel plenum chambers 501 and 504 in which the fuel inlets 536 and 539 enter from opposite sides, in accordance with an embodiment of the invention. Such inlet directions may be used with the embodiment of FIG. 1, instead of having the inlets enter from the same sides, as in FIG. 3; and may also be used with a repeating lengthwise row of fuel plenums, as described in FIG. 4.

Figure 6:
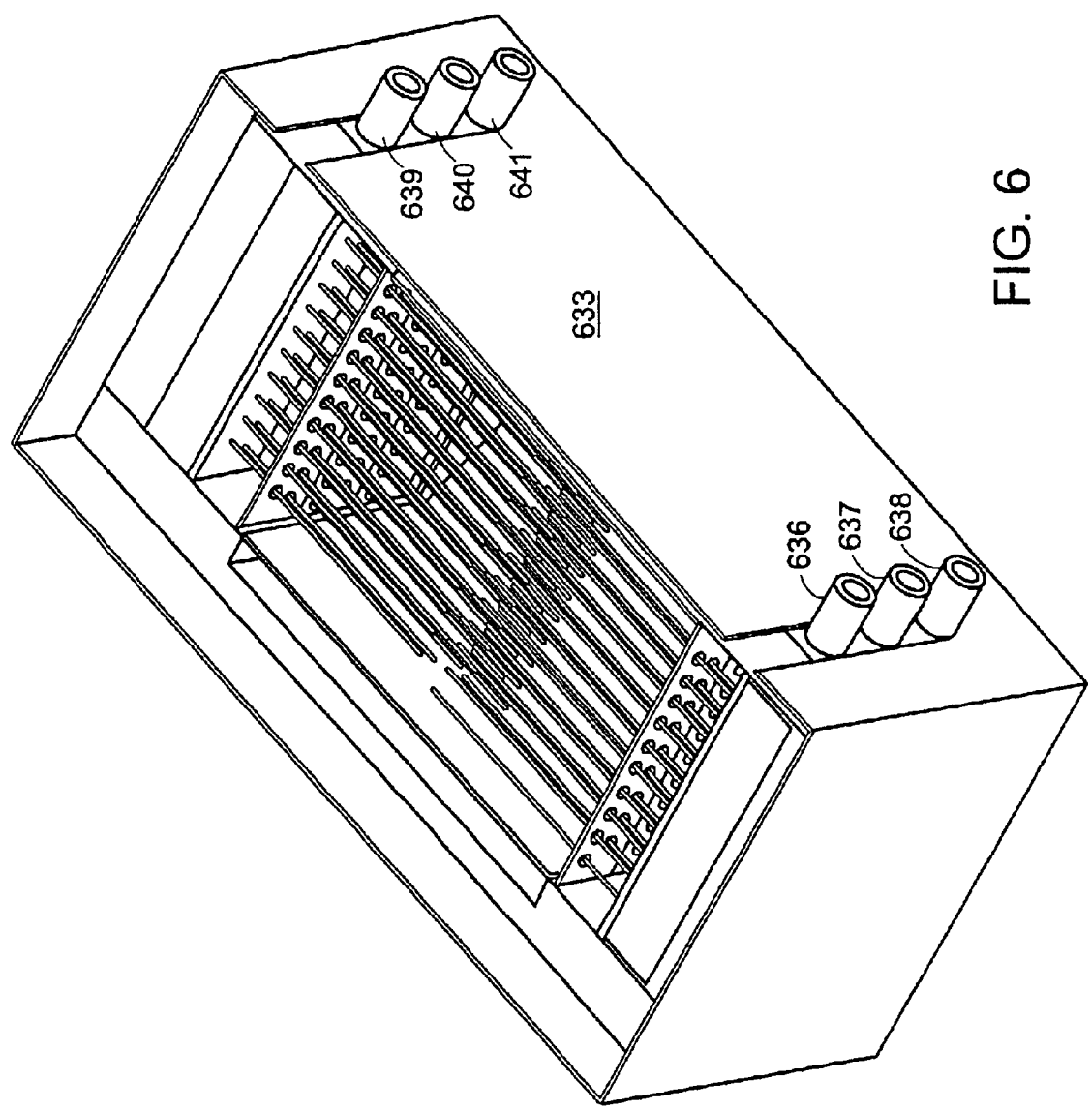
FIG. 6 shows an outside view of the system of the embodiment of FIG. 1, with a top layer removed.
Figure 7:
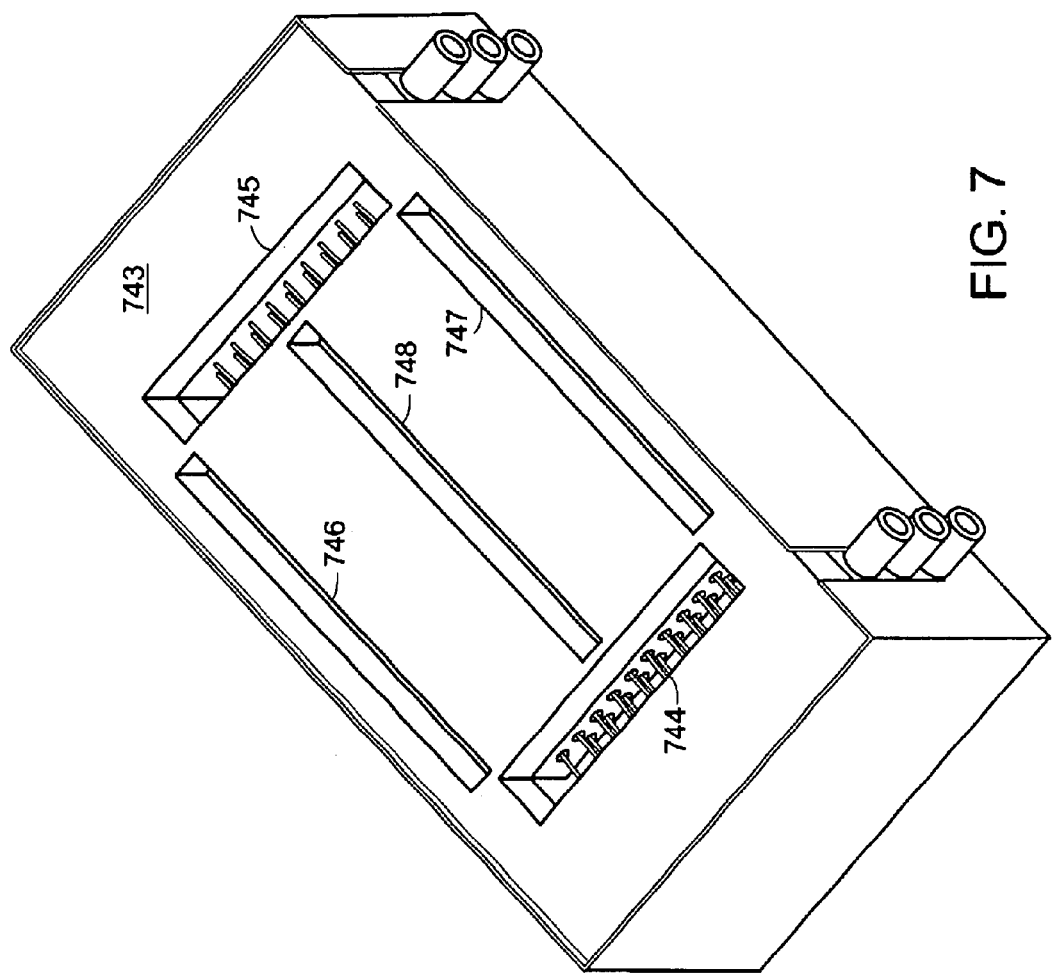
FIG. 7 shows an outside view of the system of the embodiment of FIG. 1, including a top layer of insulation.

FIGS. 6 and 7 show an outside view of the system of FIG. 1, according to an embodiment of the invention. FIG. 6 shows thermally insulating enclosure 633 surrounding the sides of the system, with the top layer removed for clarity. Fuel gas inlets 636–641 extend through the enclosure. FIG. 7 shows the top layer of insulation 743, in which there are outlets 744 and 745 from the combustion zones; outlets 746 and 747 for a pair of gas burners (shown in FIG. 8); and outlet 748 from the cathode zone.

Figure 8:
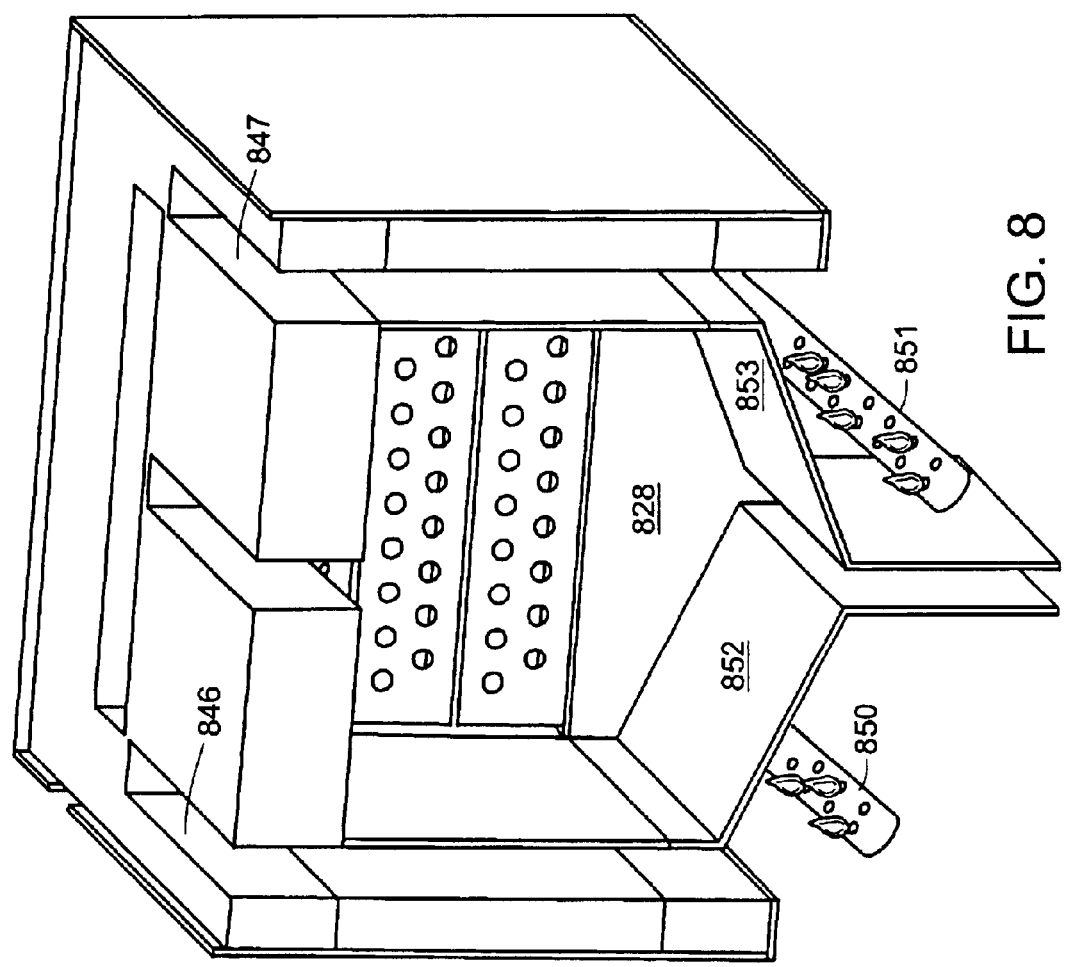
FIG. 8 shows a cross-sectional view of the embodiment of FIG. 1, at a cross-sectional angle perpendicular to that of FIG. 1, with some features omitted for clarity, and gas burners positioned underneath the cathode zone.
Figure 9:
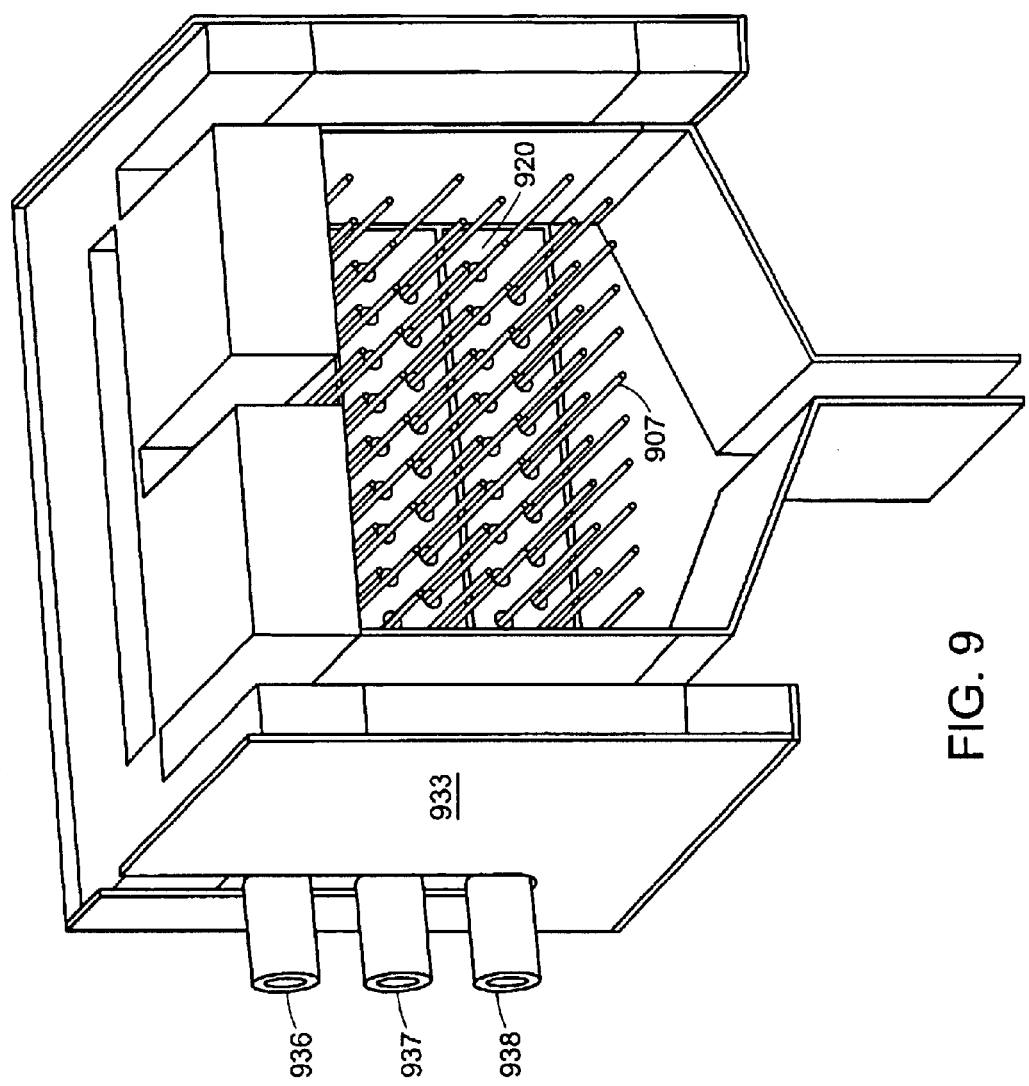
FIG. 9 shows a similar view to that of FIG. 8, with injectors extending through the combustion manifold and fuel inlets extending through the enclosure.

FIGS. 8 and 9 show a cross-sectional view of the embodiment of FIG. 1, at a cross-sectional angle perpendicular to that of FIG. 1 (with some features omitted for clarity). FIG. 8 shows gas burners 850 and 851 positioned underneath cathode zone 828. Burners 850 and 851 heat the walls 852 and 853 of the cathode zone 828, thereby assisting in heating the air in the cathode zone to an operational temperature. Exhaust from the gas burners rises through outlets 846 and 847. FIG. 9 shows a similar view to that of FIG. 8, with injectors 907 extending through combustion manifold 920, and fuel inlets 936–938 extending through enclosure 933.

In accordance with an embodiment of the invention, the injectors (such as injectors 107 and 109 of FIG. 1) also act as current collectors for fuel cells 208. A wire or mesh connected to the fuel cell's anode makes electrical contact with the injector. Since the injector and fuel plenum are made of conducting material, electrical connections to the fuel cells' anodes may then be made by connecting to the walls of the fuel plenum chambers. When the fuel plenums are partitioned into separate chambers by electrical insulation, the electrically-parallel fuel cell bundles associated with each of the opposing fuel plenum chamber pairs may then be placed in series with each other, using connections to the fuel plenum chamber walls as anode connections. Connections to the fuel cells' anodes and cathodes are made using wire mesh and bus bars, in a similar fashion to that described in a further embodiment below. Since gravity pulls fuel cell 208 down onto injectors 207 and 209, a wire mesh structure may also serve to maintain a gap for fuel gas flowing between the upper surface of the injector and the fuel cell.

Figure 10:
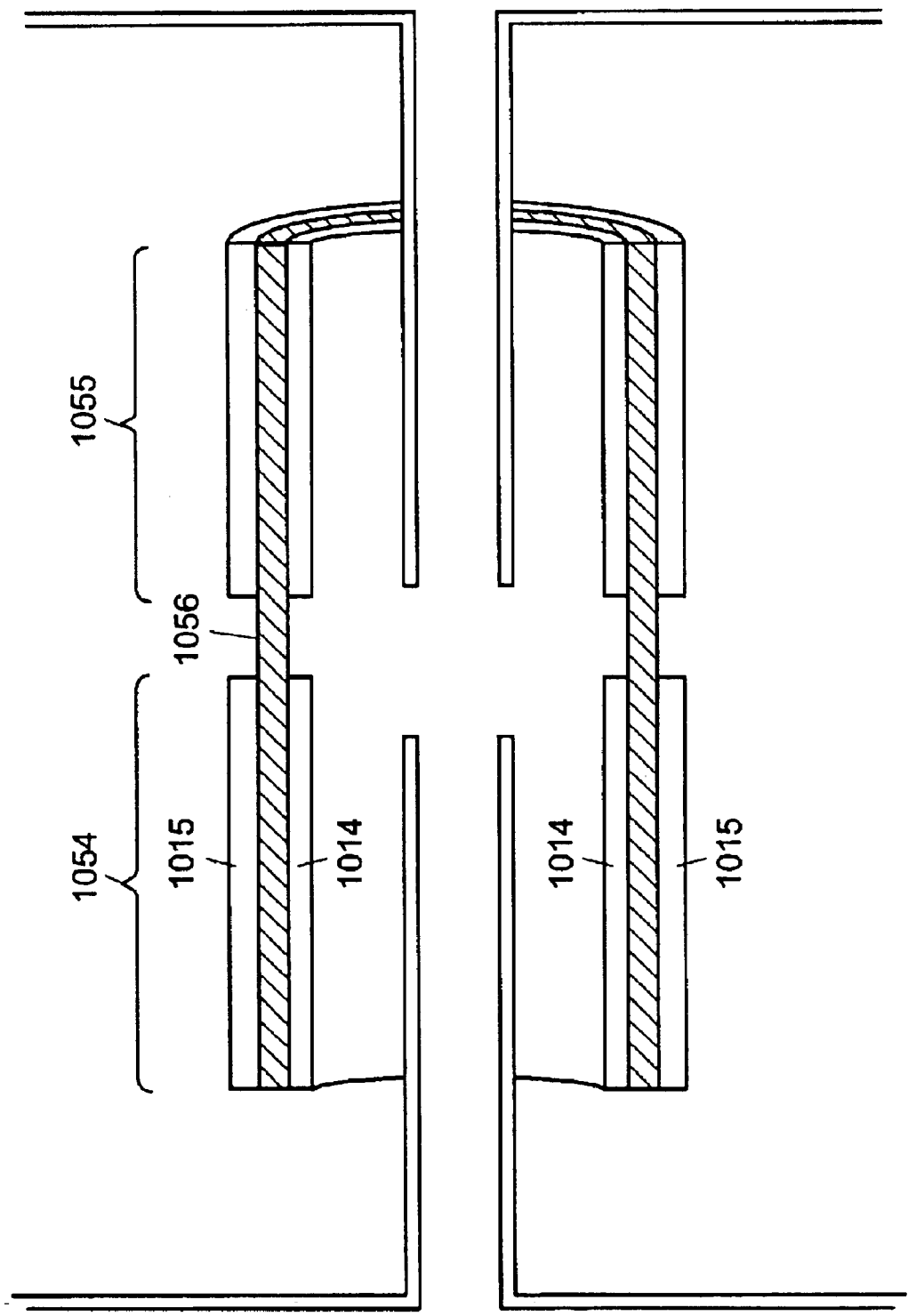
FIG. 10 shows a cross-sectional view of an embodiment in which the fuel cell anode and cathode layers are split into segments, with a common electrolyte supporting all segments.

FIG. 10 shows a cross-sectional view of an embodiment in which the anode and cathode layers 1014 and 1015 are split into segments 1054 and 1055, with a common electrolyte 1056 supporting all segments. Segments 1054 and 1055 thus function as separate fuel cells, with each developing the same voltage that the whole unsegmented tube would have developed. The voltage of the system may thus be doubled using such a technique.

Exhaust gases from combustion zones 112 and 113 (such as $CO_2$, $CO$, $CH_4$, $H_2O$, and $H_2$) may be removed without being combusted, in accordance with one embodiment of the invention. In such a case, the inlets into the bottom of combustion zones 112 and 113 are closed off, thereby preventing combustion by cutting off the entry of air. The exhaust gases are recirculated through ducts from outlets 744 and 745 back down to fuel inlets 336–341, instead of being combusted.

Figure 11:
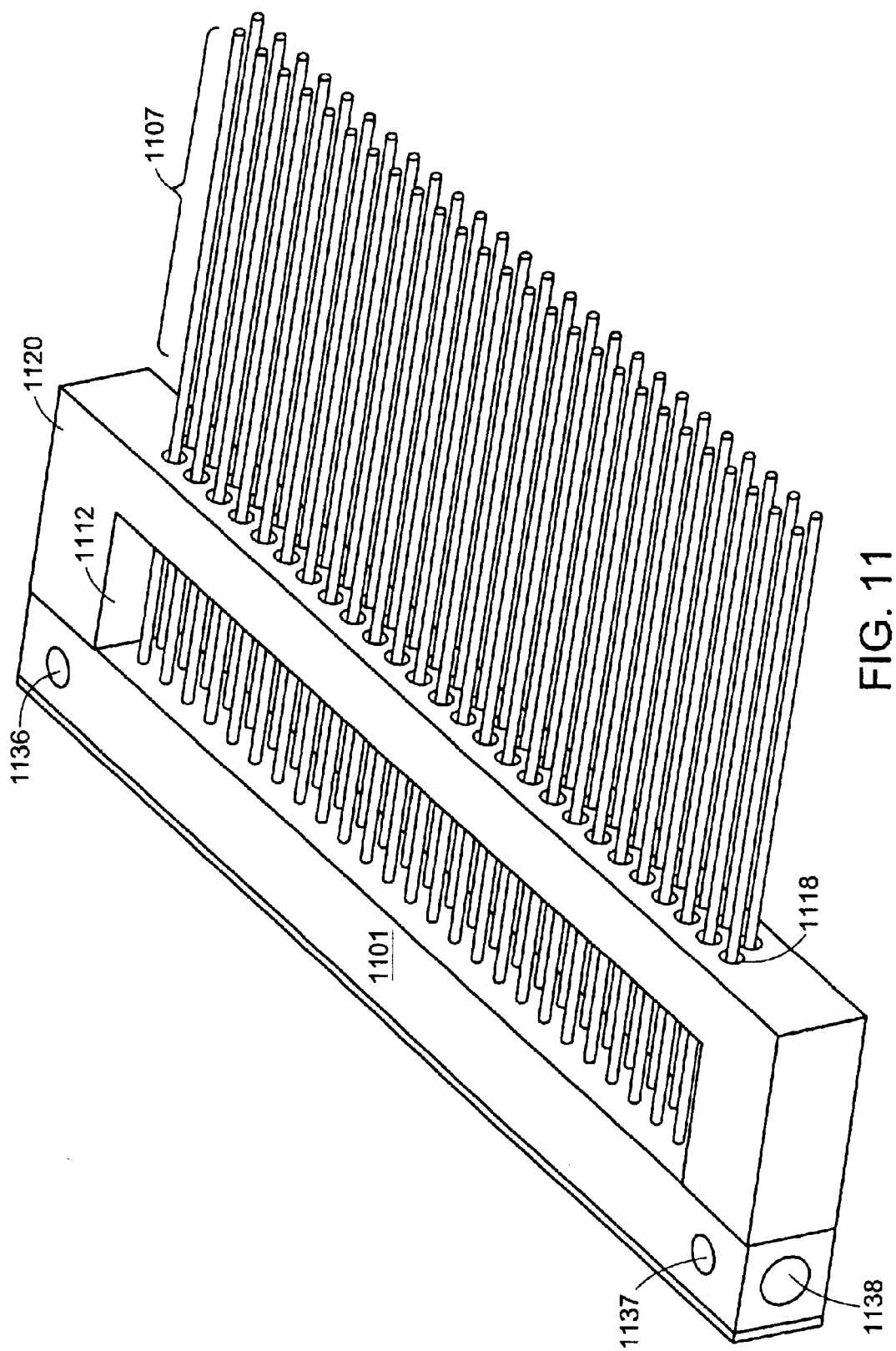
FIG. 11 shows a fuel plenum chamber, combustion manifold, and set of injectors for another embodiment according the invention, in which the combustion manifold is made of ceramic fiberboard.

FIG. 11 shows a fuel plenum chamber, combustion manifold, and set of injectors for another embodiment according the invention, described with reference to FIGS. 11–15. In this embodiment, combustion manifold 1120 is made of a U-shaped piece of ceramic fiberboard, through which a dual row of injectors 1107 extends. When fiberboard 1120 is compressed, it forms a seal around the fuel cells (not shown in FIG. 11) as gaps 1118 are pressed closed. Combustion zone 1112 is thus sealed off from the cathode zone. Gas inlets 1136–1138 are formed in the metal fuel plenum chamber 1101.

Figure 12:
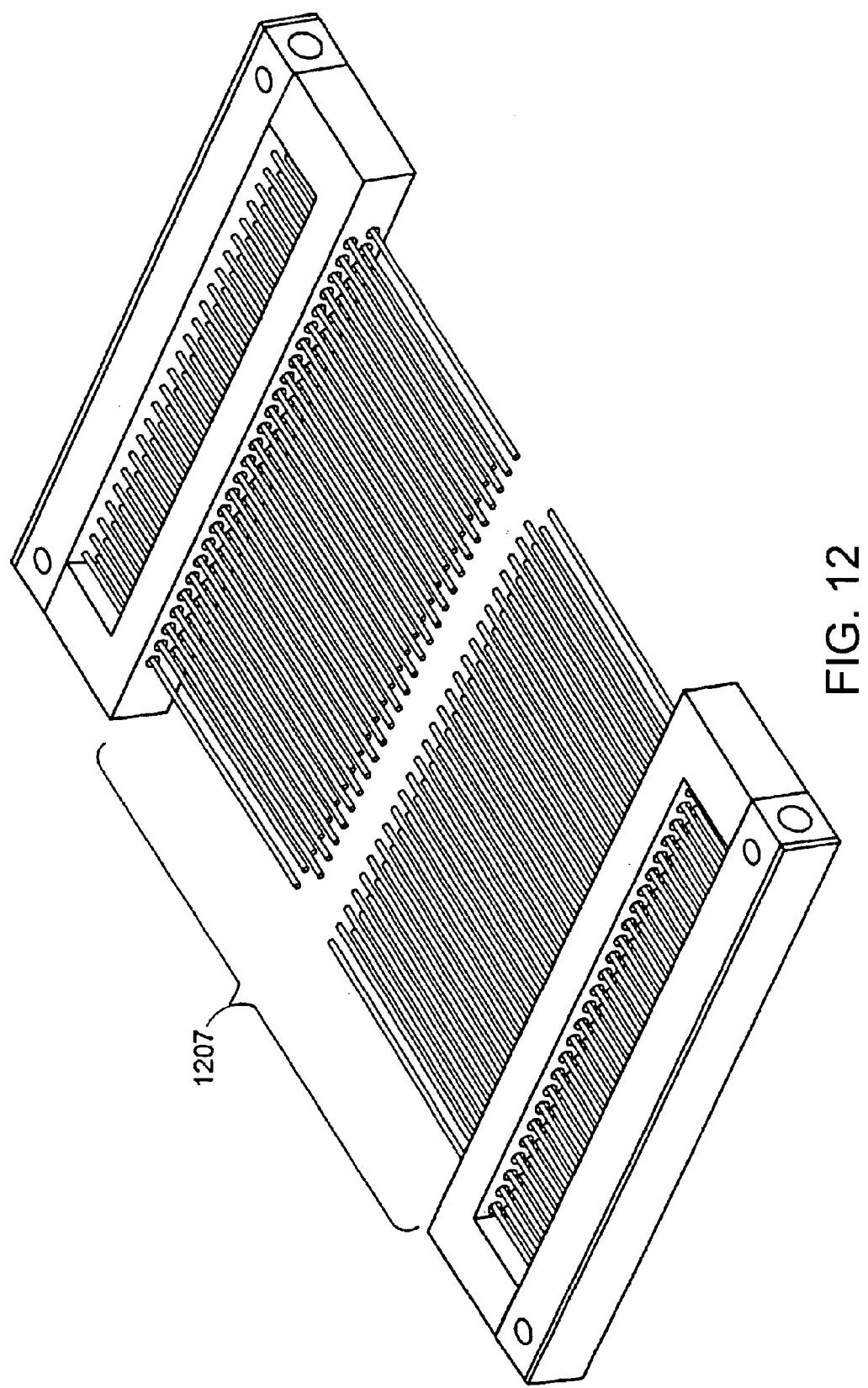
FIG. 12 shows two of the assemblies of the embodiment of FIG. 11 arranged opposite each other to form a layer of dual injectors.
Figure 13:
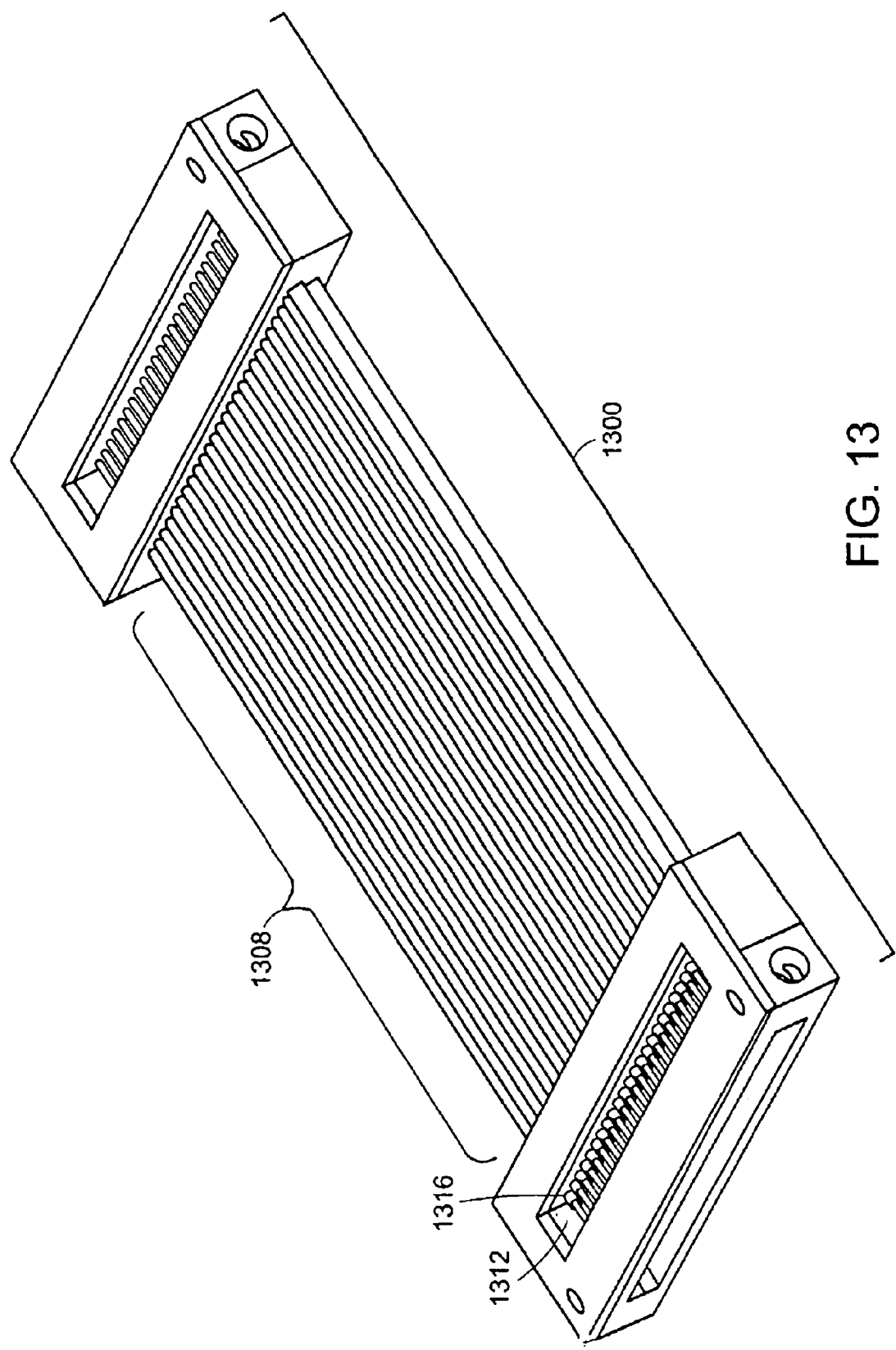
FIG. 13 shows fuel cells positioned over each pair of opposing dual injectors of the embodiment of FIG. 12.
Figure 14:
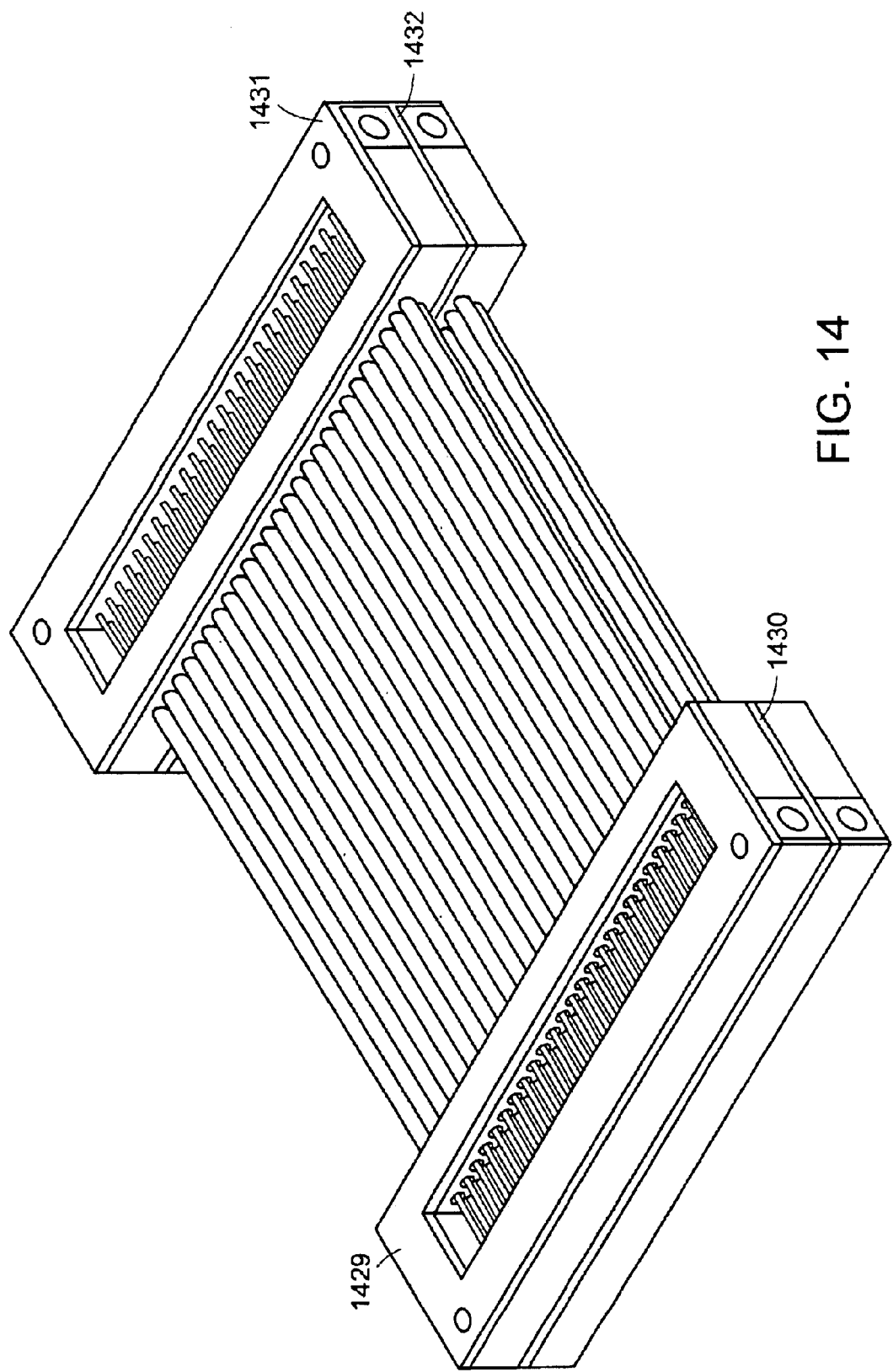
Figure 15:
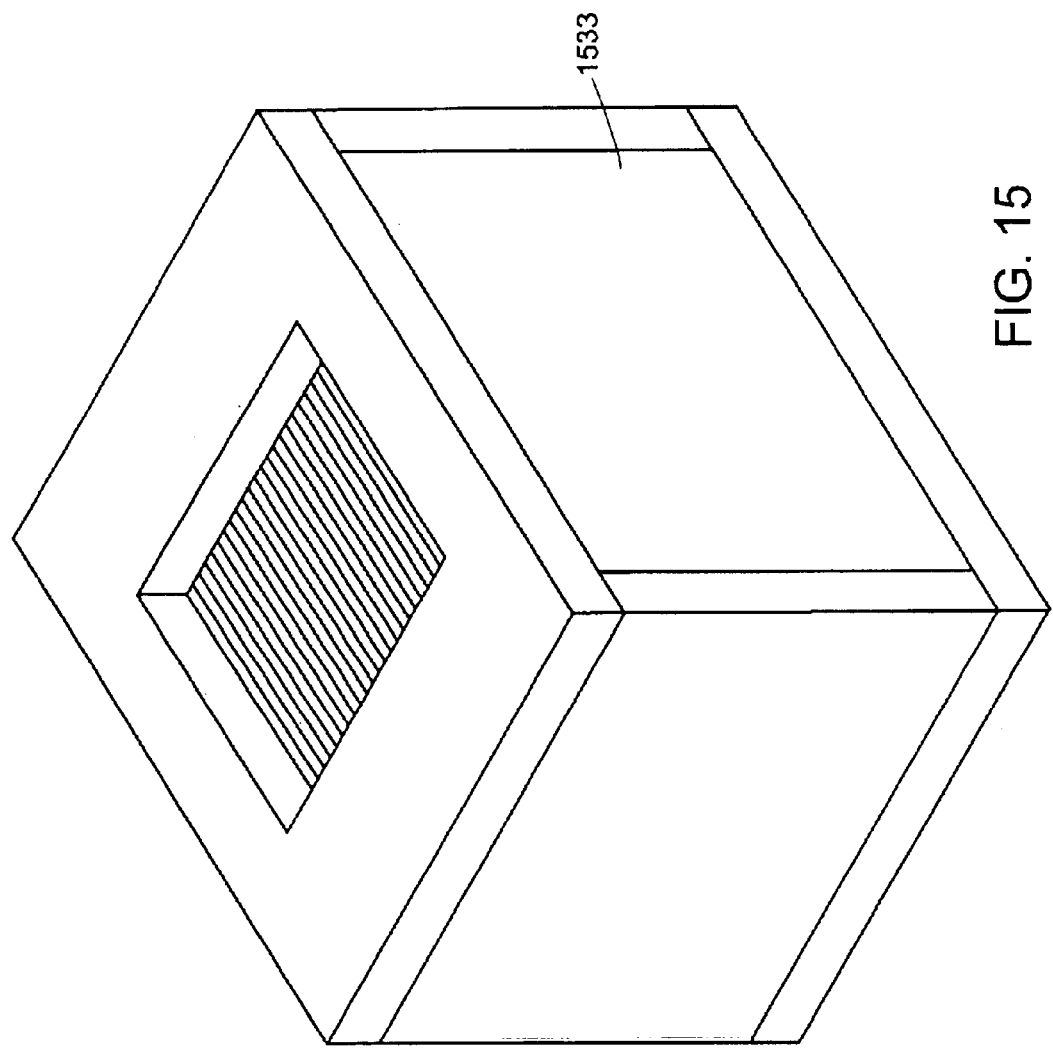
FIG. 15 shows a stack of ten layers of the embodiment of FIG. 14, surrounded by a thermally insulating enclosure.

FIG. 12 shows two of the assemblies of FIG. 11 arranged opposite each other to form a layer of dual injectors 1207. In FIG. 13, fuel cells 1308 are shown positioned over each pair of opposing dual injectors (i.e. injectors 1207 of FIG. 12) with the ends of the fuel cells 1316 extending into combustion zone 1312. Assembly 1300 forms a single layer of electrically parallel fuel cells. As shown in FIG. 14, placing such layers in series is facilitated by stacking the layers on top of each other, with electrically insulating layers 1429–1432 between. Insulating layers 1429–1432 are formed, for example, of $\frac{1}{16}$″ thick ceramic fiber blanket. FIG. 15 shows a set of ten layers, stacked as described for FIG. 14, and surrounded by a thermally insulating enclosure 1533. Compressing the walls of enclosure 1533 enables compression of the ceramic fiberboard combustion manifolds (such as manifold 1120 of FIG. 11), to form a seal around the ends of the fuel cell tubes. The fuel cells may also be glued (for example, with ceramic glue) to the combustion manifold, to provide a better seal around the cells.

Figure 16:
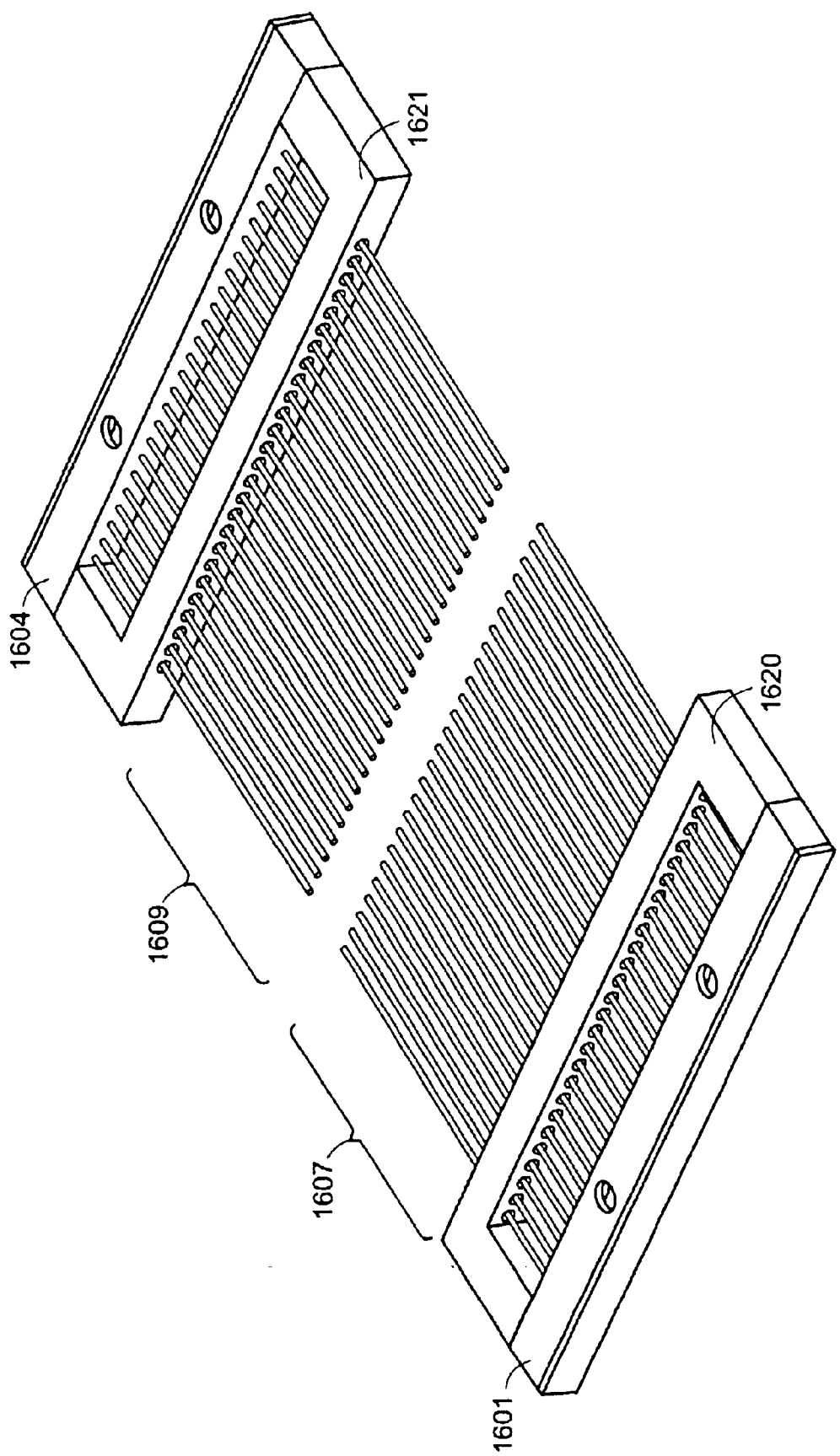
FIG. 16 shows a single layer of opposing fuel plenum chambers, injectors, and combustion manifolds, in accordance with an embodiment of the invention.
Figure 17:
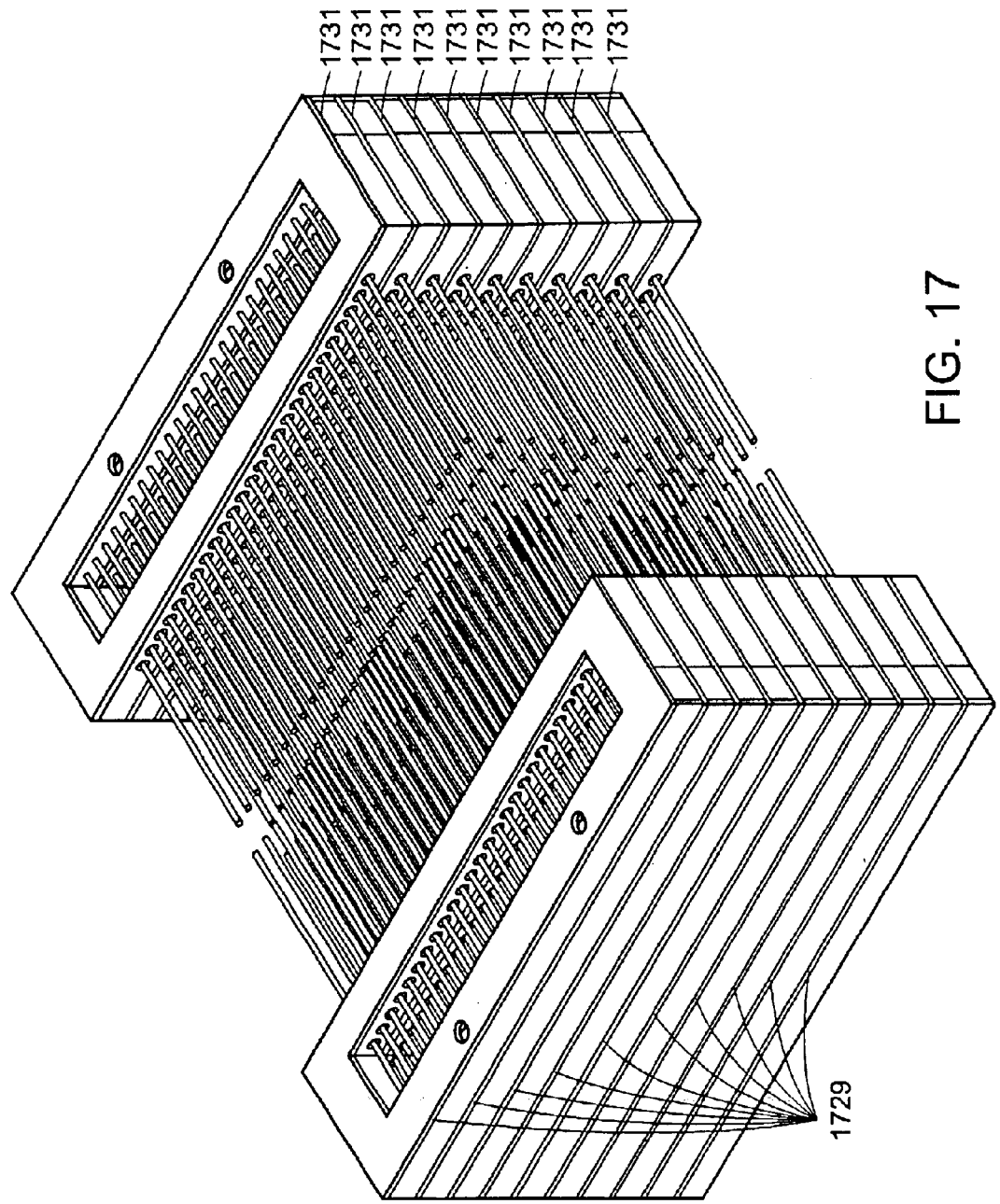

FIGS. 16 and 17 illustrate an embodiment according to the invention, that is similar to that of FIGS. 11–15, but has a single row of dual injectors 1607 in each layer, instead of two rows. FIG. 16 shows a single layer of opposing fuel plenum chambers 1601 and 1604, injectors 1607 and 1609, and combustion manifolds 1620 and 1621. The combustion manifolds 1620 and 1621 are formed by U-shaped pieces of ceramic fiberboard, as in the embodiment of FIG. 11. FIG. 17 shows ten layers, each layer similar to the layer of FIG. 16, stacked on top of each other with electrically insulating layers 1729 and 1731 between, in a similar fashion to the embodiment of FIG. 14. The arrangement of FIG. 17 thus allows ten sets of 25 electrically-parallel fuel cells to be placed in series.

Figure 18:
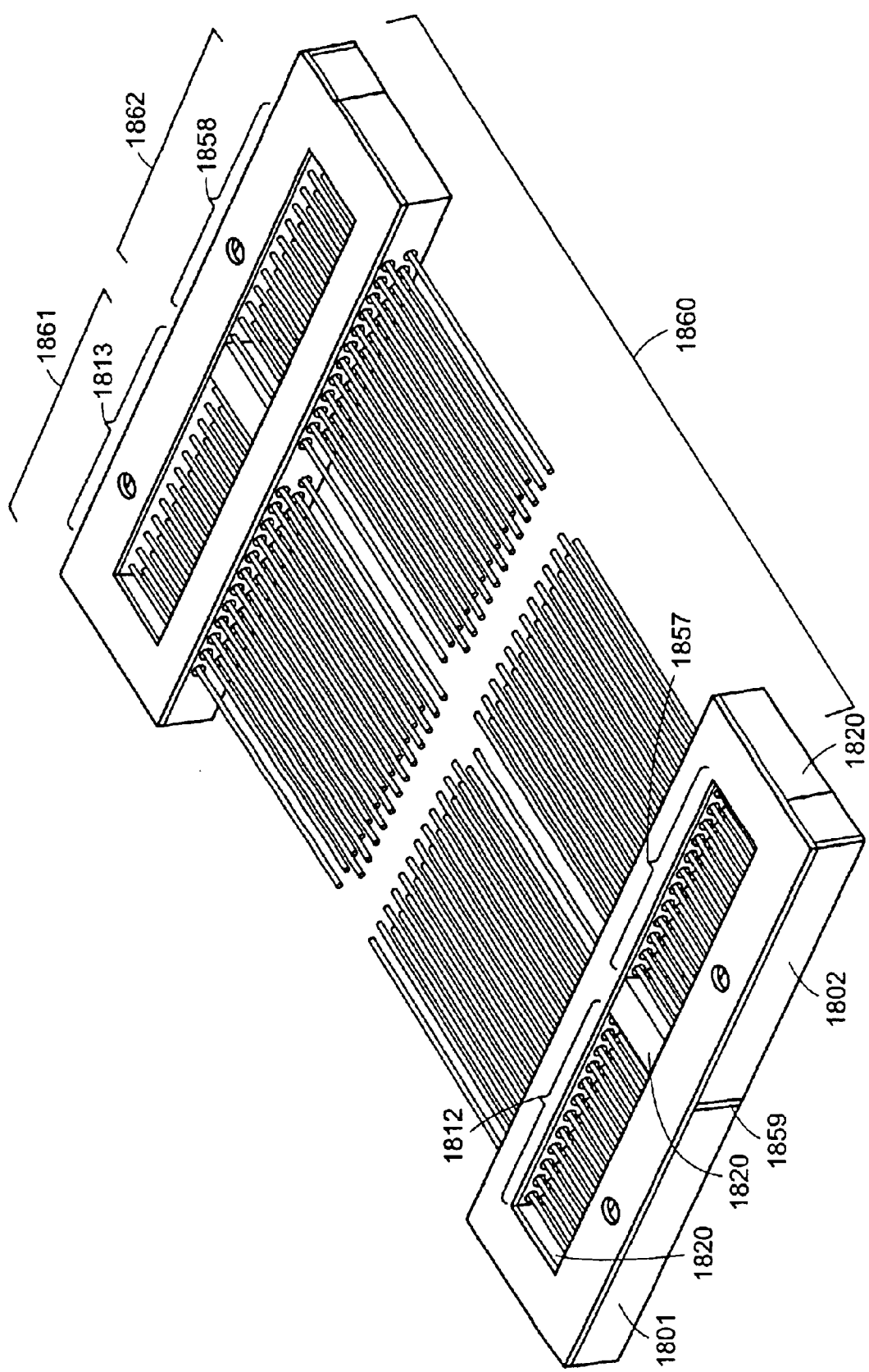
FIG. 18 shows an embodiment according to the invention in which an E-shaped combustion manifold separates the combustion zones on each side of the system into two halves, vertically.
Figure 19:
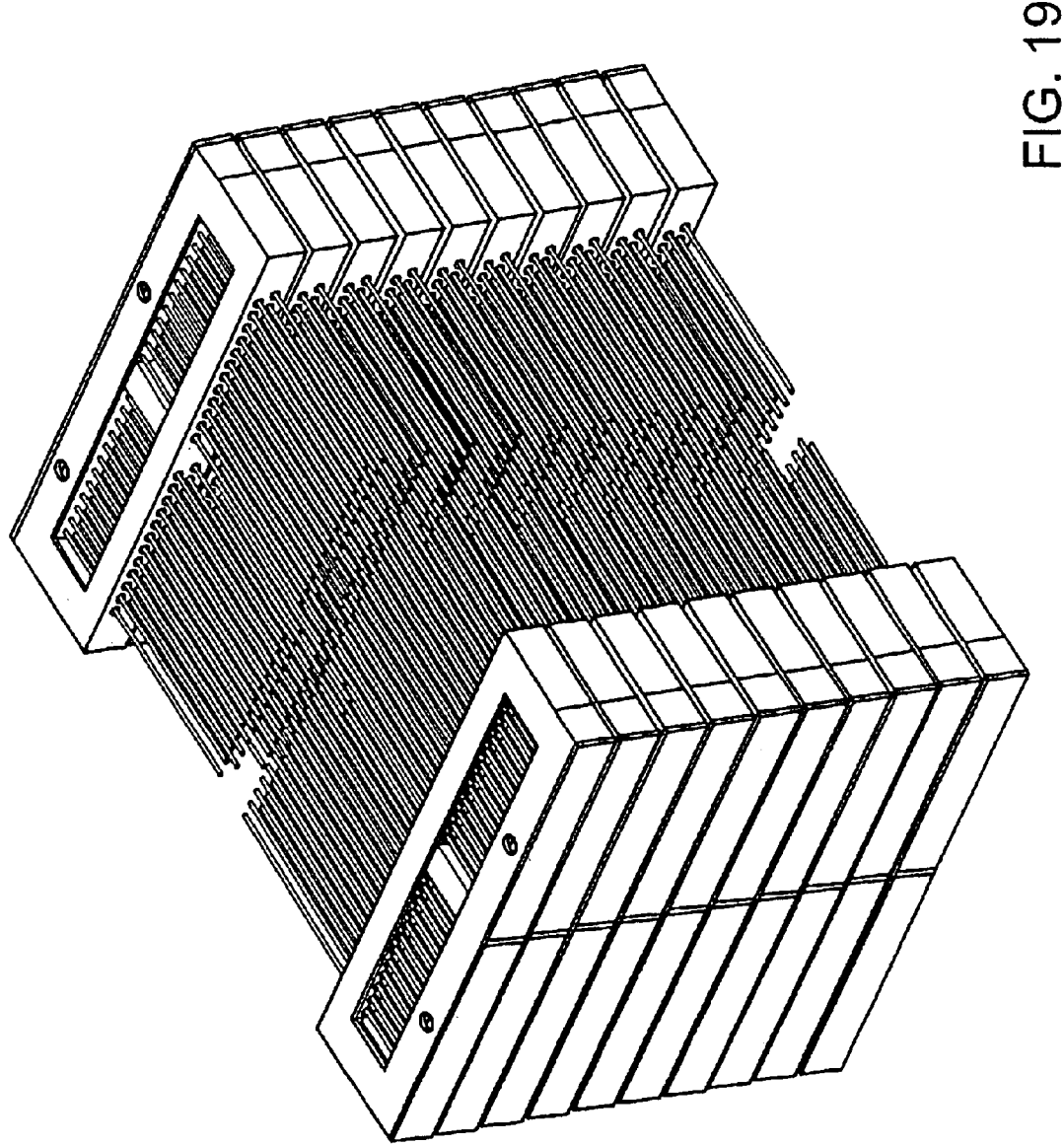
FIG. 19 shows ten of the layers of the embodiment of FIG. 18 stacked on top of one another, allowing twenty bundles of electrically-parallel fuel cells to be placed in series.
Figure 20:
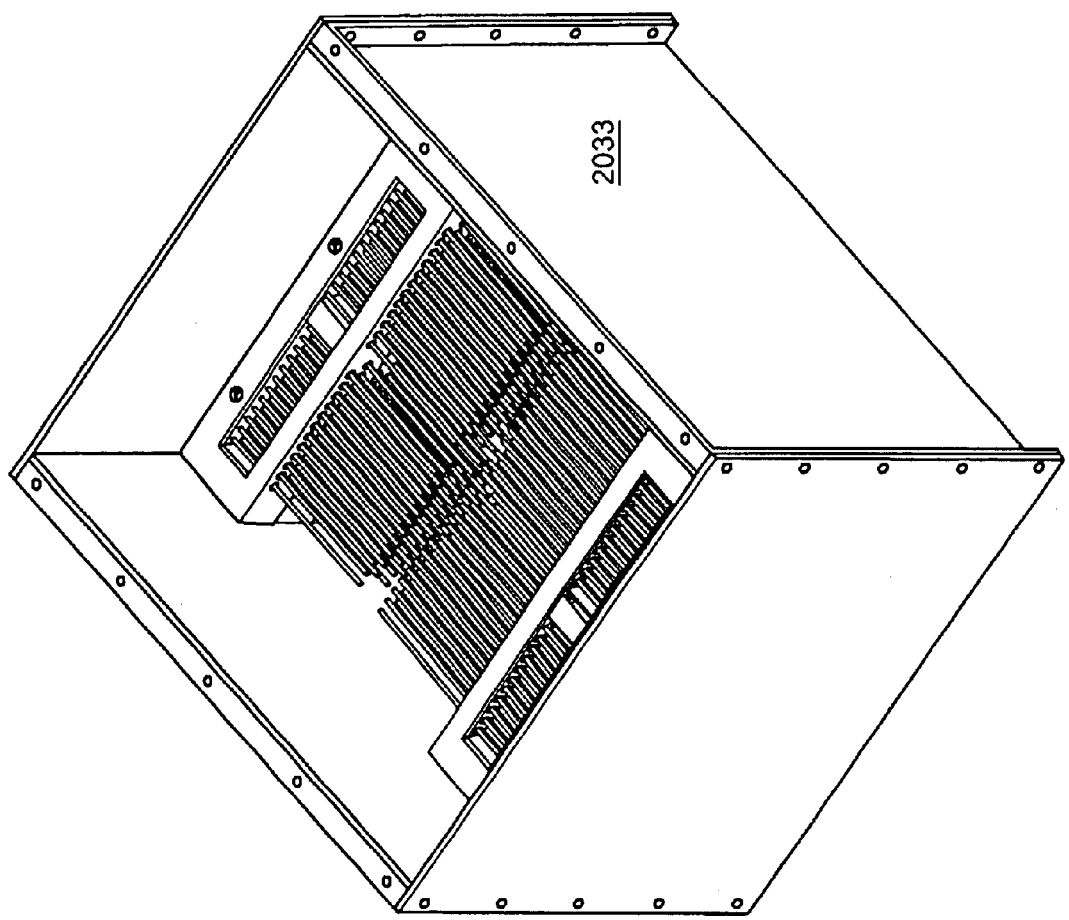
FIG. 20 shows a metal enclosure surrounding the layers of the embodiment of FIG. 19.

FIGS. 18–20 illustrate an embodiment according to the invention that is also similar to that of FIGS. 11–15, but that has an E-shaped combustion manifold 1820. The E-shape separates the combustion zones on each side of the system into two halves, vertically (i.e. halves 1812, 1857 on one side, and halves 1813, 1858 on the other). A layer of electrical insulation 1859 also separates the fuel plenum chambers 1801, 1802 on each side of the system, so that separate electrical connections may be made to the anodes of the fuel cells associated with each fuel plenum chamber. Thus, each layer 1860 has two side-by-side sets 1861 and 1862 of electrically parallel bundles of fuel cells, instead of just one, as in the embodiments of FIG. 11. Placing these bundles in series thus allows increasing the voltage of a stack of a given size. FIG. 19 shows ten of the layers of FIG. 18 stacked on top of one another, allowing twenty bundles of electrically-parallel fuel cells to be placed in series (one bundle for each half of the ten layers). FIG. 20 shows a metal enclosure 2033 surrounding the layers of FIG. 19.

The layered technique of fabricating the tubular fuel cell stacks of the embodiments of FIGS. 11–15, 16–17, and 18–20 facilitates production: it allows repeated fabrication of layer-halves (such as the assembly shown in FIG. 11) by different workers (or automated production processes) simultaneously, instead of requiring fabrication of the entire stack as one piece.

Figure 21:
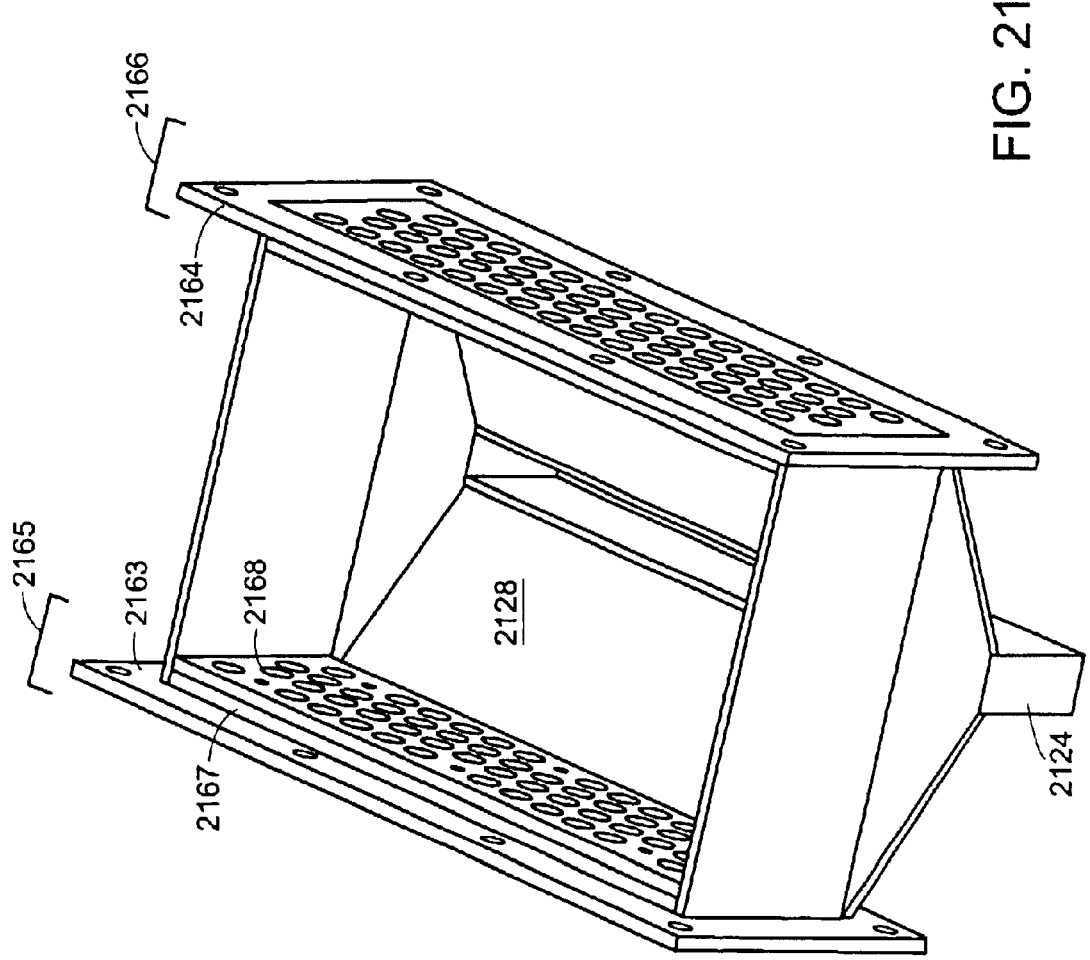
FIG. 21 shows a view of a system having a fuel inlet plate and a fuel outlet plate for unidirectional fuel flow through horizontal fuel cell tubes, in accordance with an embodiment of the invention.

FIG. 21 illustrates features of an embodiment according to the invention in which horizontal fuel cell tubes are used without the dual injectors described above. Fuel cell tubes (not shown) extend horizontally between holes in a fuel inlet plate 2163 and a fuel outlet plate 2164; fuel gas enters the fuel cell tubes at their fuel inlet plate ends, and flows through to their fuel outlet plate ends. Air rises into the cathode zone 2128 of the system through air inlet 2124. Both the fuel inlet wall 2165 and the fuel outlet wall 2166 are formed of a tri-layered sealing structure (described further below) that has a ceramic fiberboard layer 2167 sandwiched between two steel layers 2163 and 2168.

Figure 22:
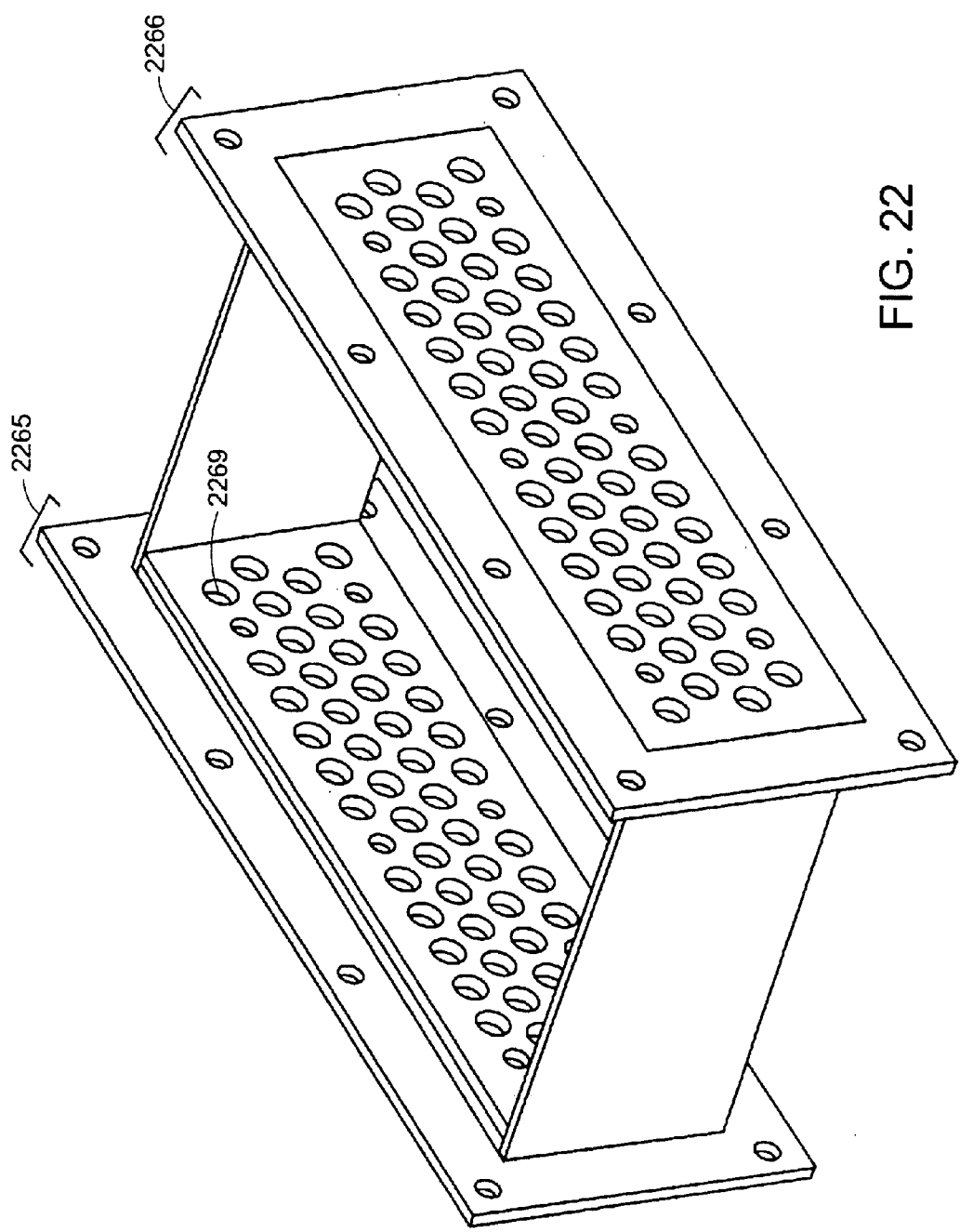
FIG. 22 shows a close-up view of the embodiment of FIG. 21, without the bottom air inlet housing.

FIG. 22 shows a close-up view of the embodiment of FIG. 21, without the bottom air inlet housing. Holes 2269 extend through all three layers of walls 2265 and 2266, so that the ends of the horizontal fuel cell tubes may extend through the holes.

Figure 23:
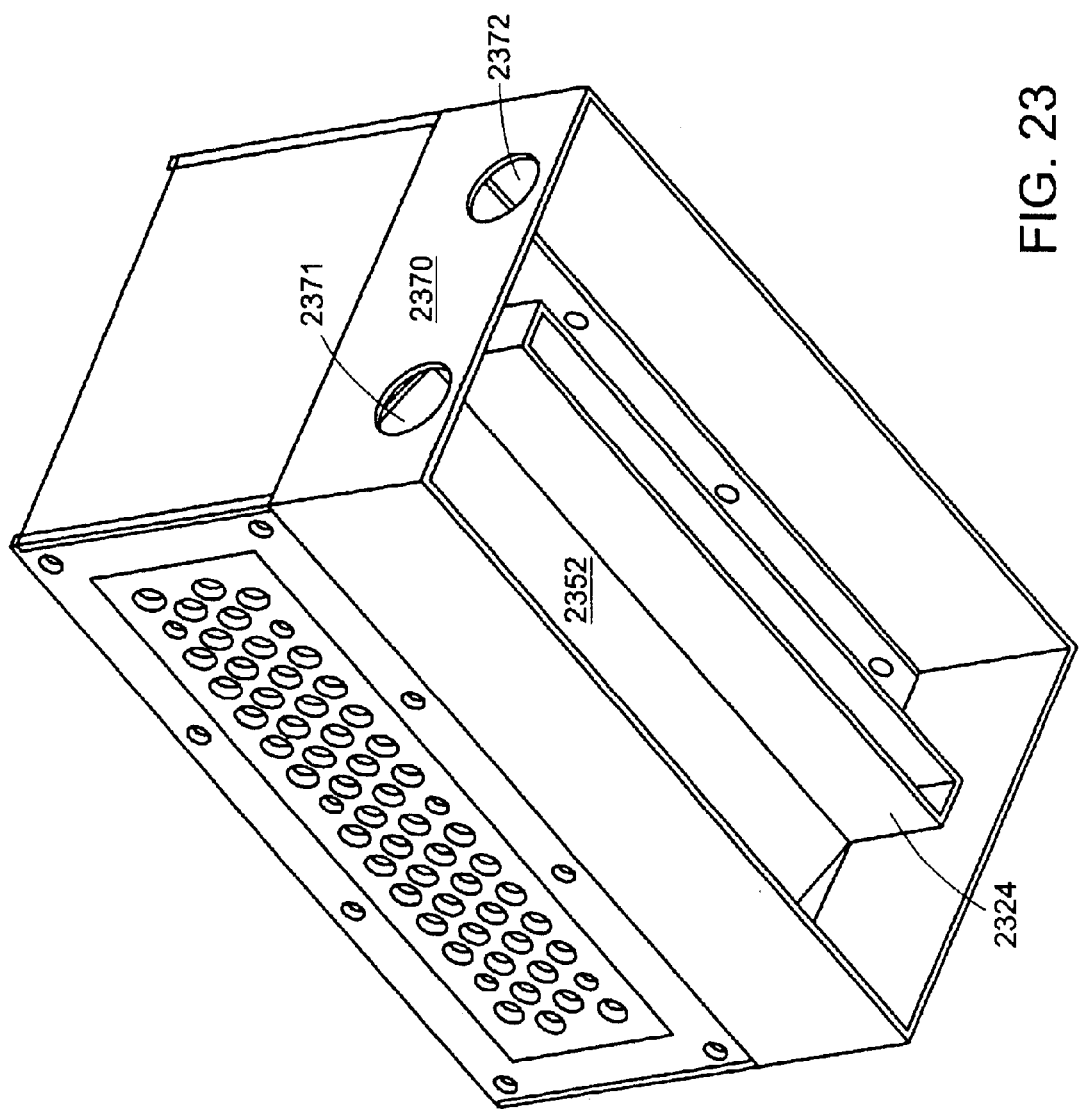
FIG. 23 shows a bottom view of the embodiment of FIG. 21, with a gas burner housing attached.

FIG. 23 is a bottom view of the embodiment of FIG. 21, with a gas burner housing 2370 attached. Holes 2371 and 2372 in the gas burner housing allow two gas burners (shown in FIG. 25) to extend through the holes 2371, 2372, and heat the bottom walls 2352 of the cathode zone of the system. This helps to heat air entering the air inlet 2324 to an operating temperature.

Figure 24:
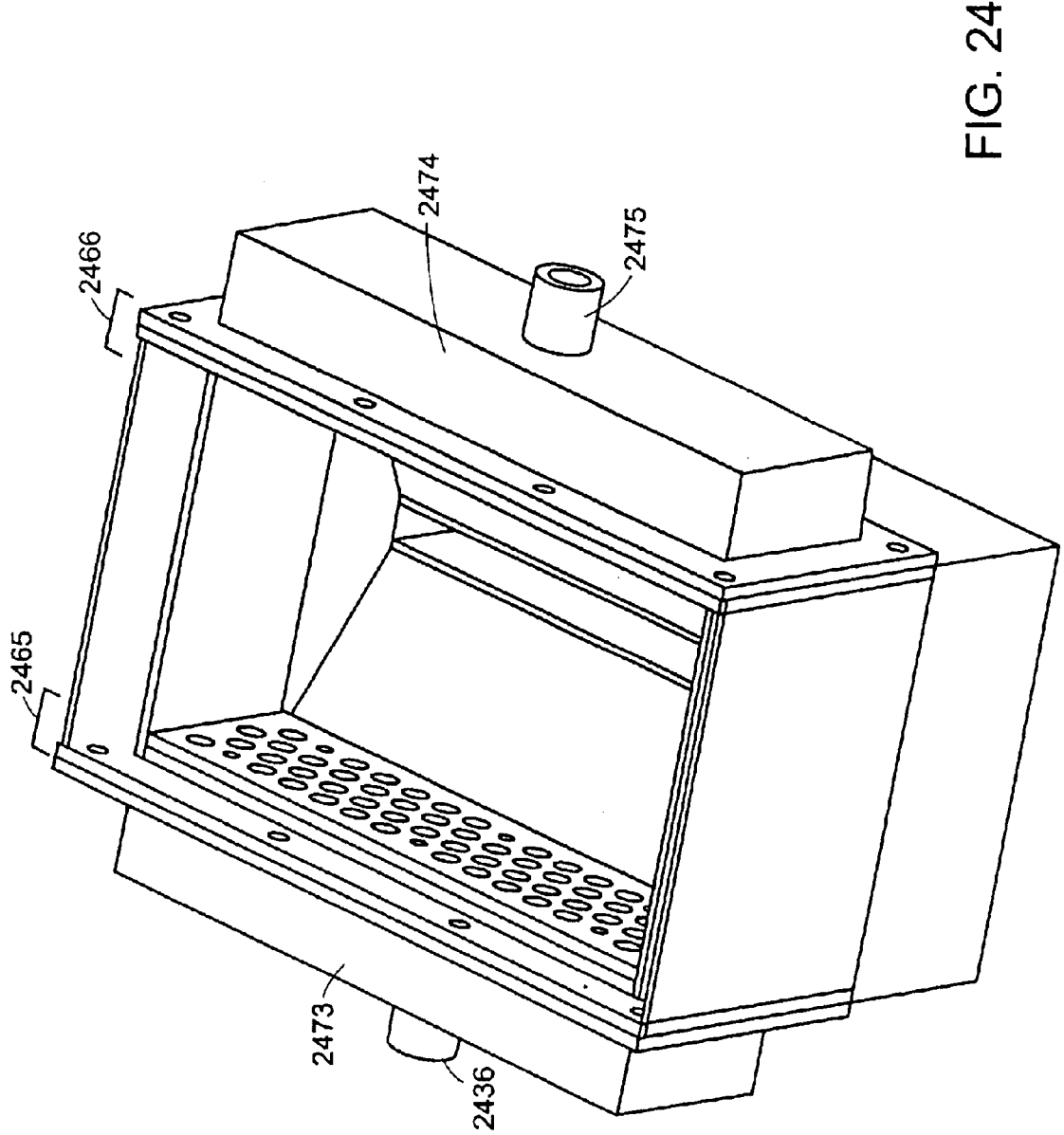
FIG. 24 shows a view of the embodiment of FIG. 23 with a fuel inlet manifold and a fuel outlet manifold attached.

FIG. 24 shows the embodiment of FIG. 23 with a fuel inlet manifold 2473 and a fuel outlet manifold 2474 attached. Fuel gas enters inlet 2436; is distributed to the open ends of the fuel cell tubes (not shown) that extend through fuel inlet wall 2465; flows through the tubes to fuel outlet wall 2466; and exits through outlet 2475. Exhaust from outlet 2475 may then be re-circulated through ducts (not shown) to the gas burners (shown in FIG. 25) or to the fuel gas inlet 2436, to provide additional heat.

Figure 25:
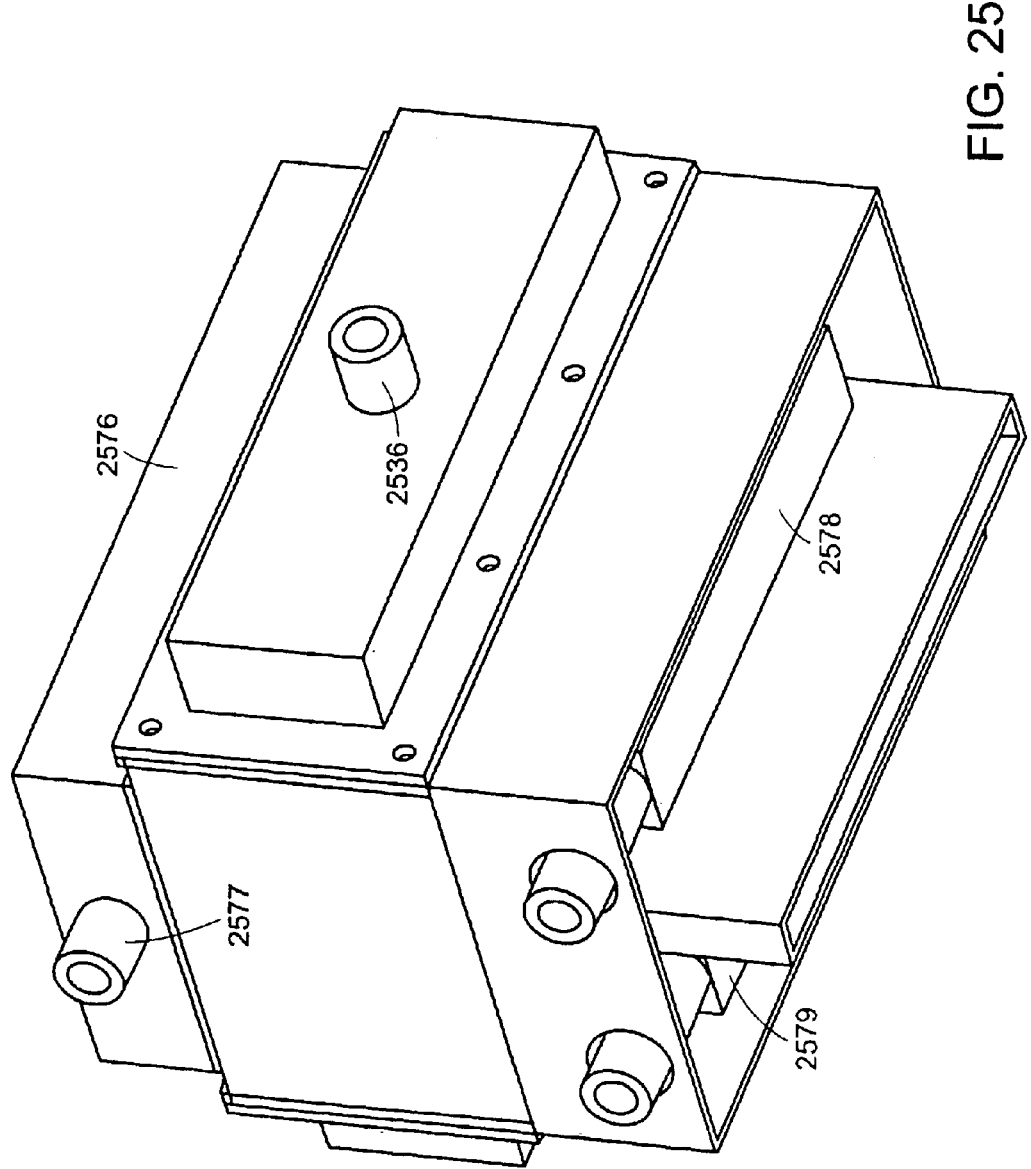
FIG. 25 shows the embodiment of FIG. 24 with a fuel pre-treatment module added.

FIG. 25 shows the embodiment of FIG. 24 with a fuel pre-treatment module 2576 added. In this embodiment, fuel gas first enters inlet 2577, and is pre-treated in module 2576. Such pre-treatment may include, for example, sulfur removal or fuel pre-reformation. After pre-treatment, the fuel then exits module 2576 through an outlet (shown in FIG. 26), and is fed through a duct (not shown) to fuel inlet 2536; after which its path is as described in FIG. 24. Gas burners 2578 and 2579 may also be seen in this view.

Figure 26:
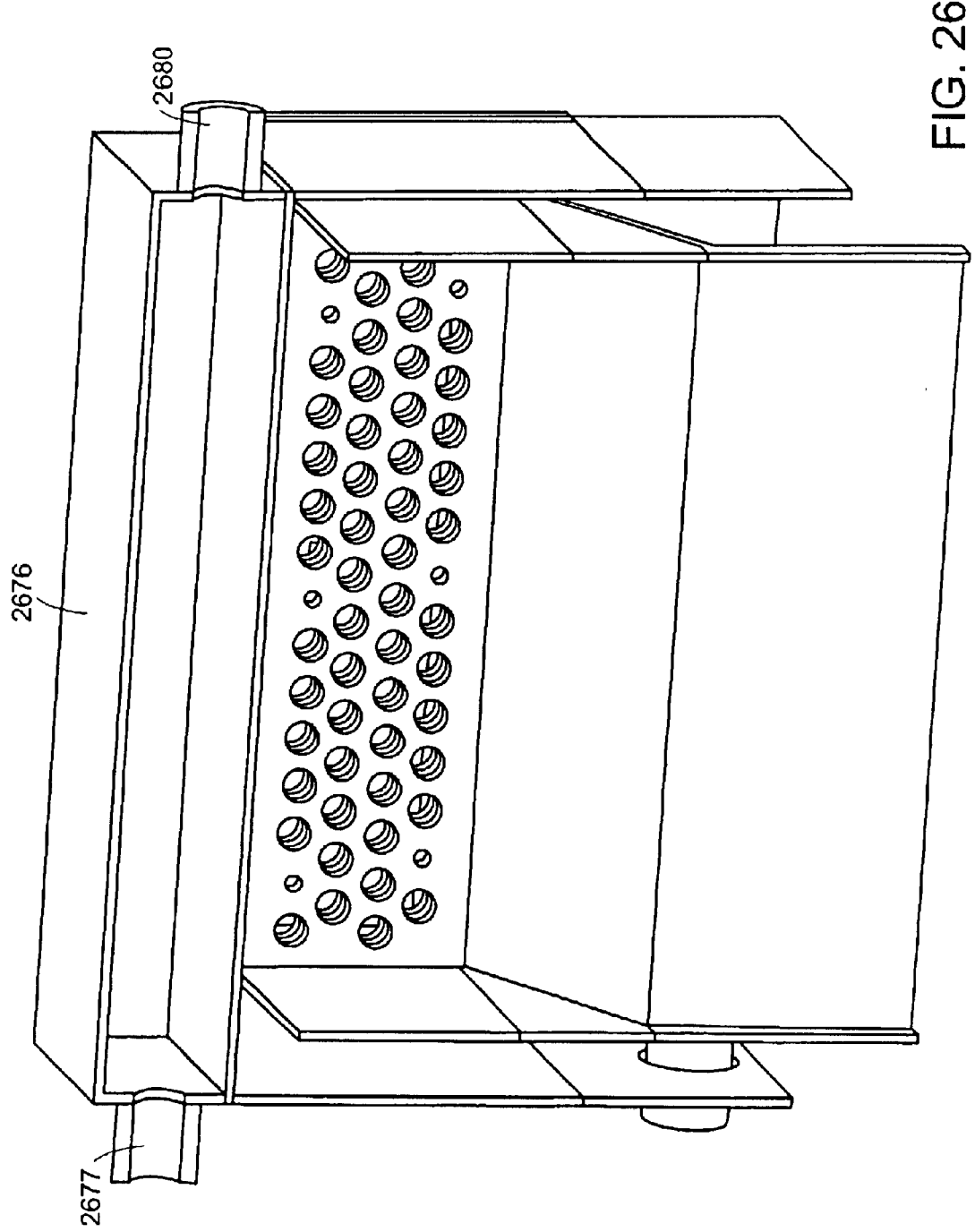
FIG. 26 shows a cross-sectional view of the embodiment of FIG. 25.

FIG. 26 shows a cross-sectional view of the embodiment of FIG. 25. Inlet 2677 and outlet 2680 of fuel pre-treatment module 2676 are shown.

Figure 27:
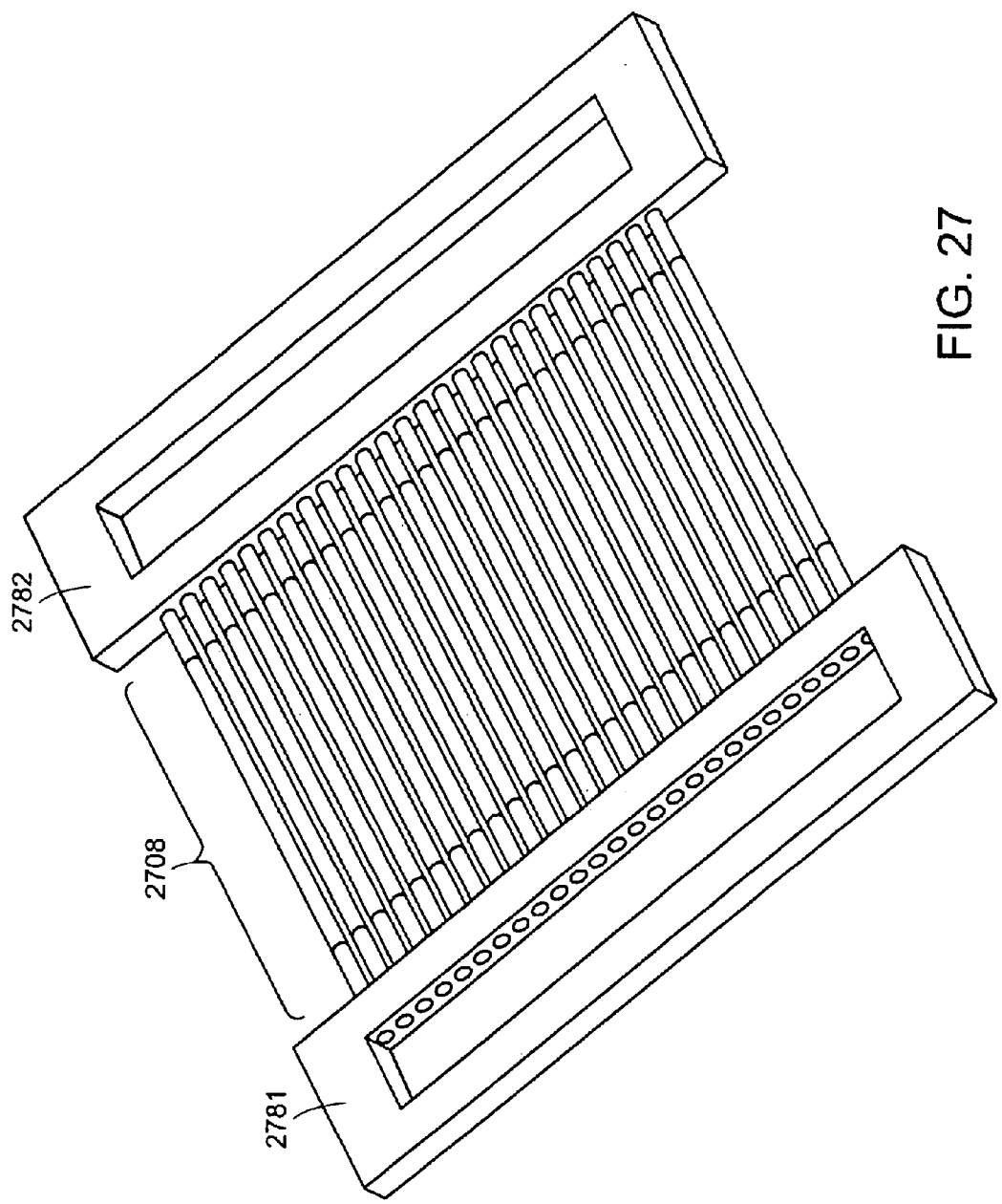
FIG. 27 shows a layer of fuel cells extending between two high-density ceramic fiberboard fuel plenums, in accordance with an embodiment of the invention.

FIG. 27 shows a layer of fuel cells, for use with a layered fuel cell system similar to the embodiments of FIGS. 21–26. In FIG. 27, a layer of fuel cells 2708 extends between two high-density ceramic fiberboard fuel plenums 2781 and 2782. The outside surfaces of the fuel cell ends are glued into the fuel plenums (for example, with ceramic glue).

Figure 28:
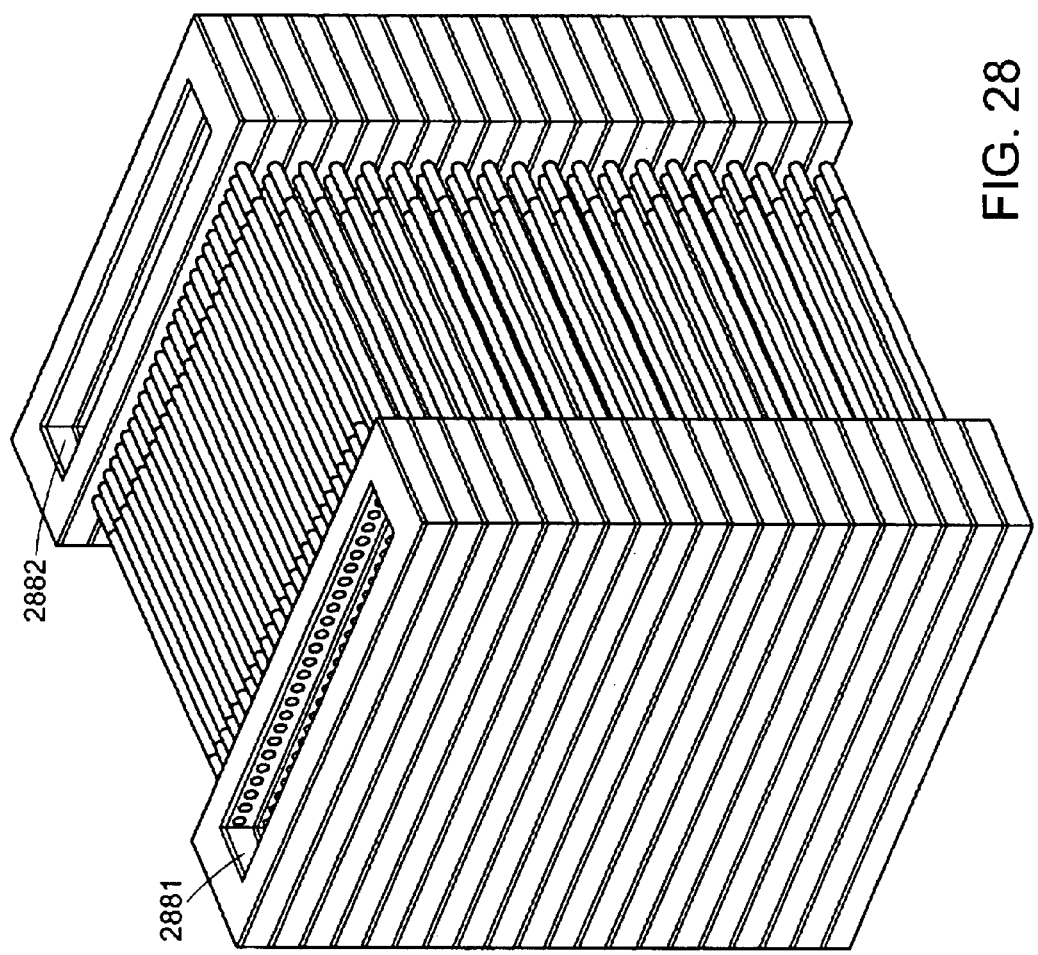
FIG. 28 shows an assembly of twenty electrically insulated layers of the embodiment of FIG. 27.

FIG. 28 shows an assembly of twenty layers, each layer similar to that of FIG. 27. By electrically insulating such layers from each other, the parallel cells of each layer may be placed in series, in a similar fashion to that described above. The assembly of the embodiment of FIG. 28 is used in a similar stack design to that of the embodiment of FIGS. 21–26, with fuel gas entering the fuel cells via fuel plenum 2881 and exiting via fuel plenum 2882.

Figure 29:
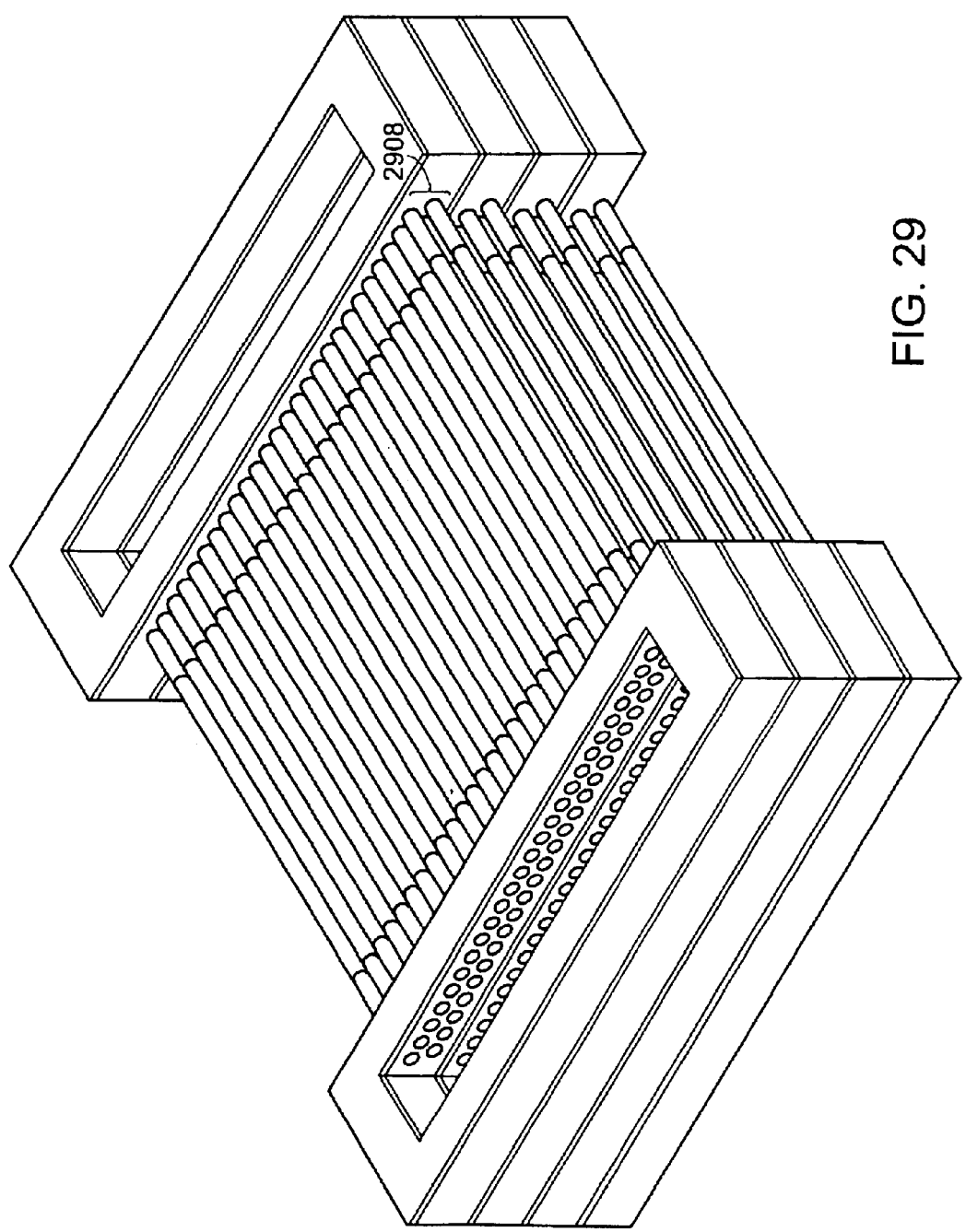
FIG. 29 shows an assembly of four layers with two rows of fuel cells present in each layer, in accordance with an embodiment of the invention.

FIG. 29 shows an embodiment in which there is an assembly of four layers, similar to those of the embodiment of FIG. 28, except that two rows of fuel cells 2908 are present in each layer, instead of one row.

Figure 30:
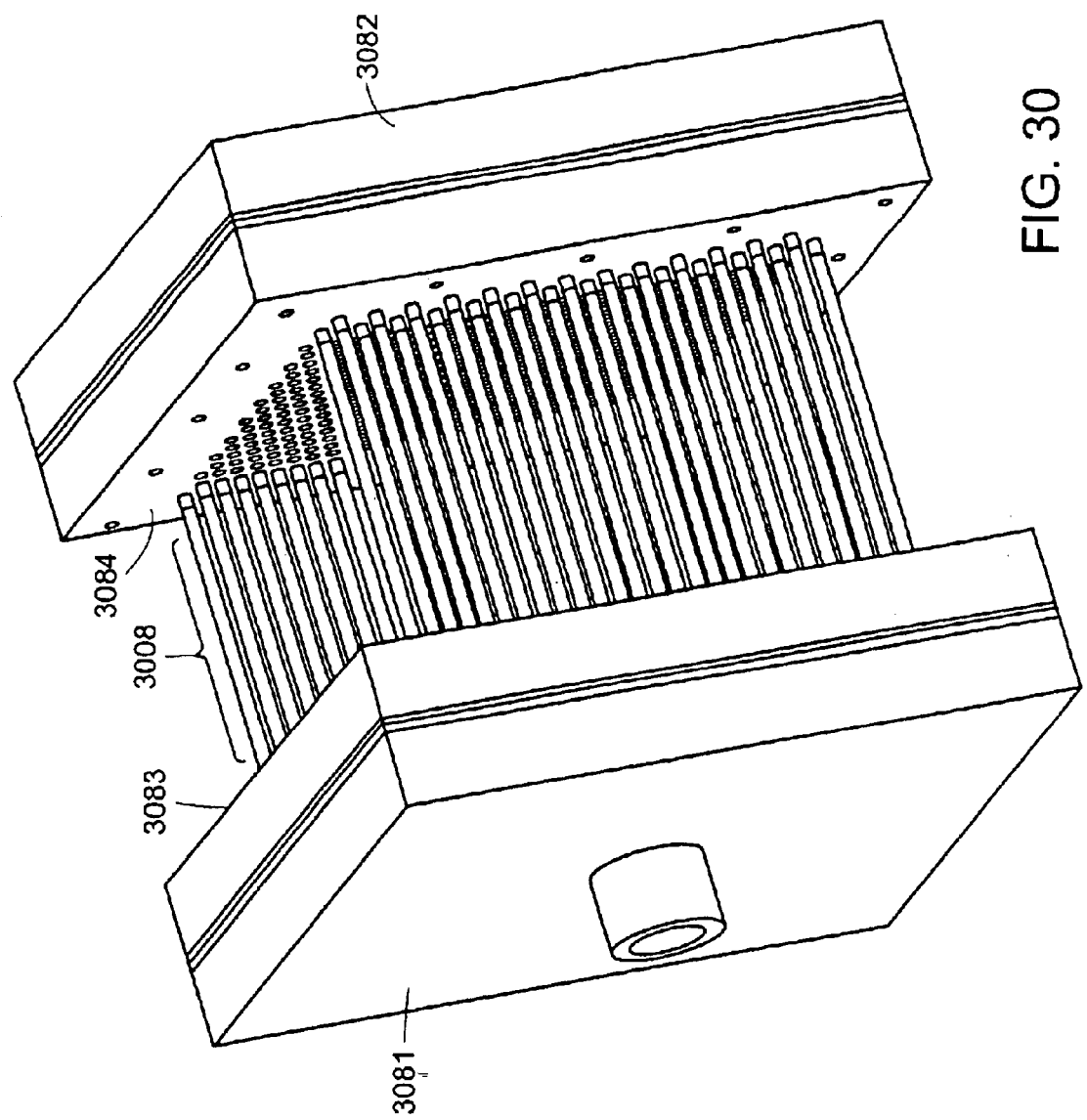
FIG. 30 shows components of an embodiment in which metal fuel plenums are sealed to high-density ceramic fiberboard fuel cell plates.

FIG. 30 shows components of an embodiment, similar to that of the embodiments of FIGS. 21–26 and 27–29, in which metal fuel plenums 3081 and 3082 are sealed to high density ceramic fiberboard fuel cell plates 3083 and 3084. As in FIG. 27, the ends of fuel cell tubes 3008 are glued into fuel cell plates 3083 and 3084.

Figure 31:
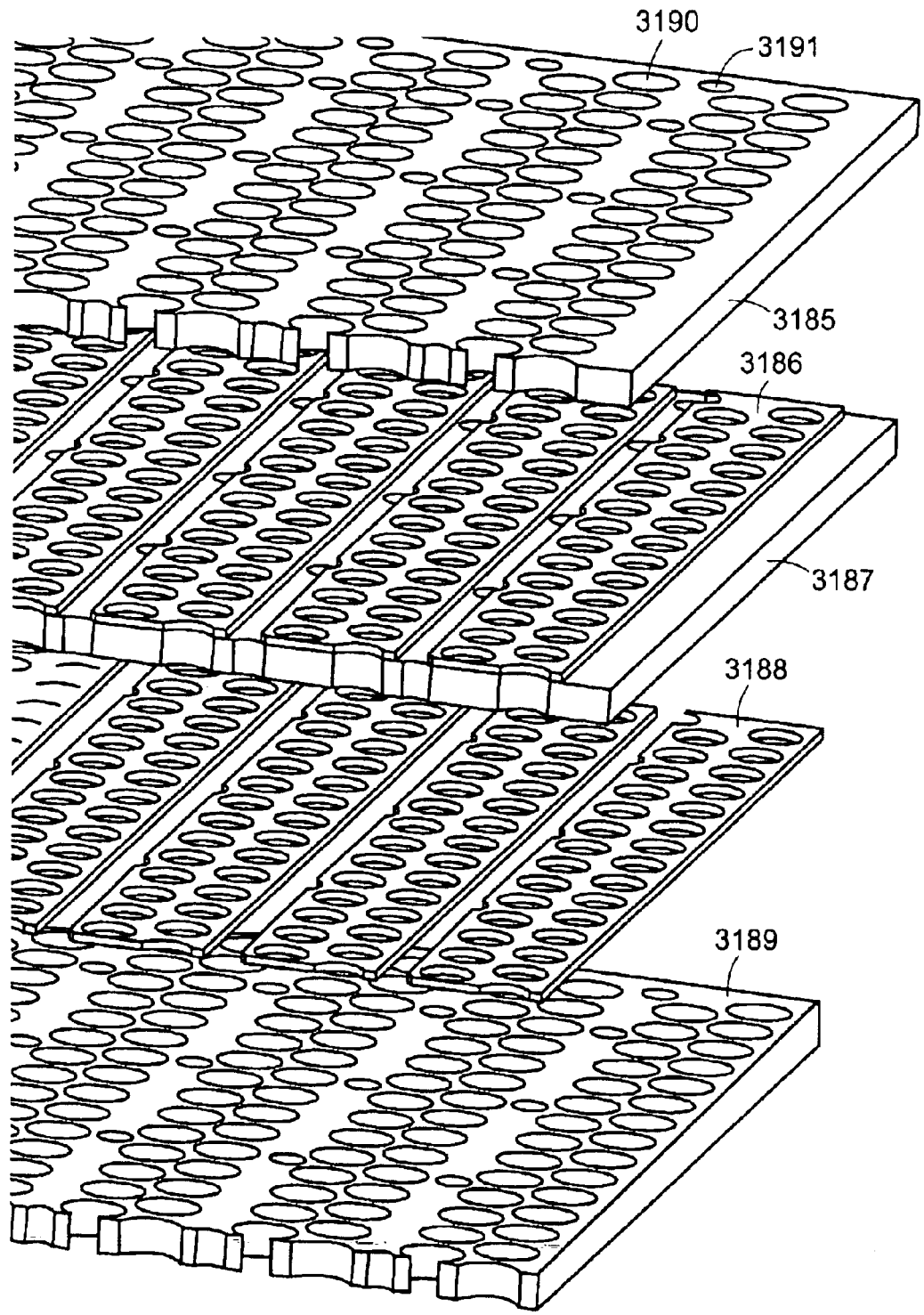
FIG. 31 shows an exploded view of four layers of a ceramic fiberboard fuel cell seal, in accordance with an embodiment of the invention.
Figure 32:
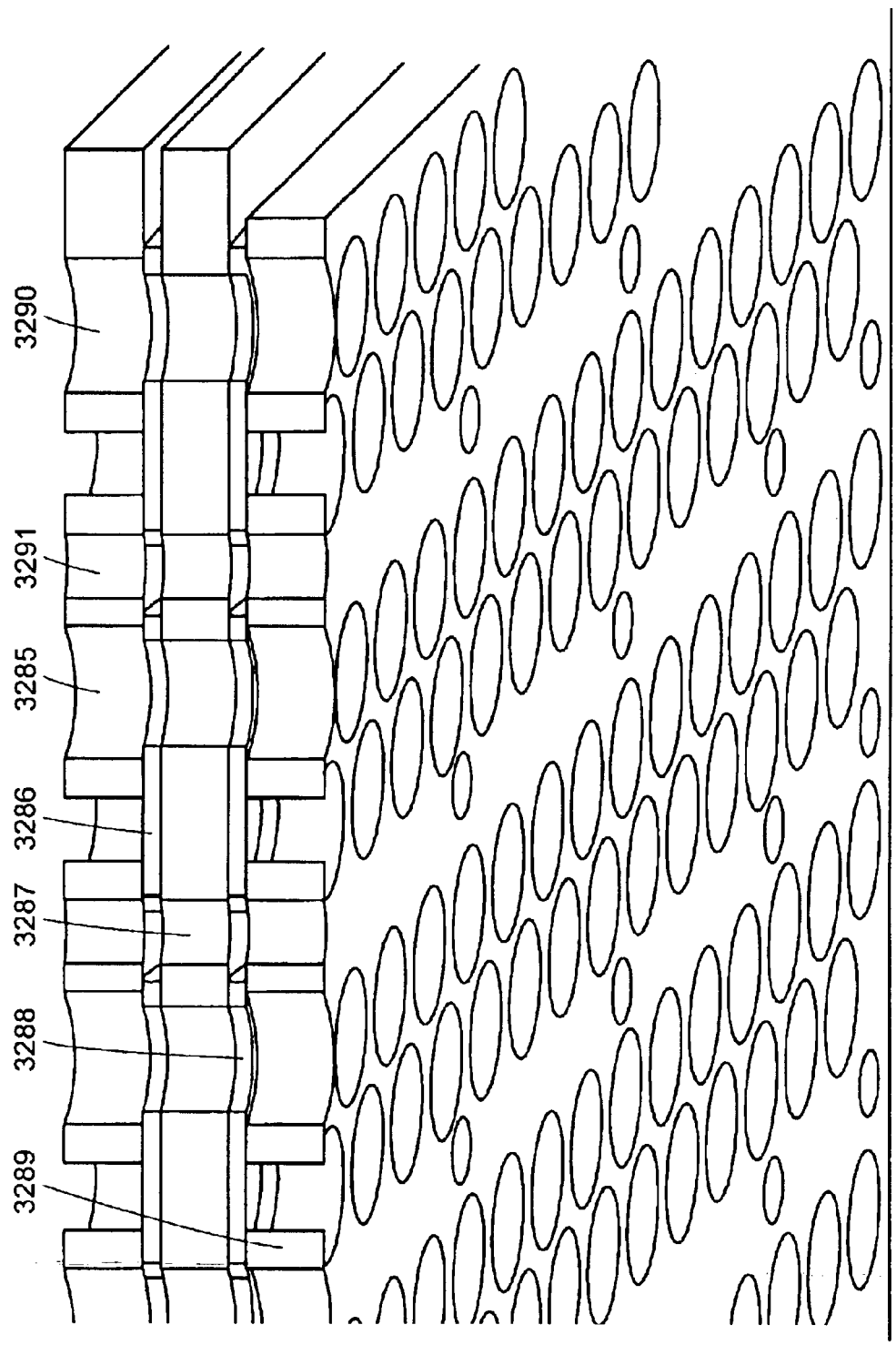
FIG. 32 shows an assembled view of the seal of the embodiment of FIG. 31.

FIGS. 31 and 32 illustrate the technique by which the metal fuel plenums of FIG. 30 are sealed to the fiberboard fuel cell plates, in accordance with an embodiment of the invention. Seals on other embodiments described herein may also be made using an analogous technique. The exploded view of FIG. 31 shows the following layers: a first steel fuel cell plate 3185; a first layer of individual sealing plates 3186; a layer of compressed ceramic fiberboard insulation 3187; a second layer of individual sealing plates 3188; and a second steel fuel cell plate 3189. Fuel cell tubes are inserted through holes 3190. The layers are then bolted together, through bolt holes 3191, so that insulation 3187 compresses around the fuel cell tubes to form a seal.

FIG. 32 shows the assembled layers 3285–3289. Upon tightening bolts inserted through holes 3291, a ceramic seal is formed around fuel cell tubes inserted through holes 3290. The portions of holes 3290 and 3291 that extend through insulation layer 3287 are smaller than the corresponding portions in other layers, so that the insulation fits tightly around the fuel cells. Ceramic fiberboard insulation layer 3287 may be alumina-based ($Al_2O_3$), and may also be formed from a ceramic fiber blanket or ceramic fiber paper. Suitable such materials are sold, at the time of filing, by Thermal Ceramics and Saffil.

In one embodiment, no holes are initially formed in insulation layer 3287; instead, the holes are formed by pushing the fuel cells through the insulation layer, thereby pushing out a plug of insulation and forming a tighter seal around the cells. The bolts through holes 3291 may then be tightened to further tighten the seal. When such a seal is used as the wall of a combustion manifold (for example, in the embodiment of FIG. 1), a combustion catalyst (such as platinum or palladium) may be coated onto the fiber excess surfaces of the insulation layer (i.e. the surfaces that are between the diameter of the fuel cell's outer surface and the diameter of hole 3290). Such a coating helps to ensure that any fuel that leaks is oxidized (burnt to harmless species).

Figure 33A:
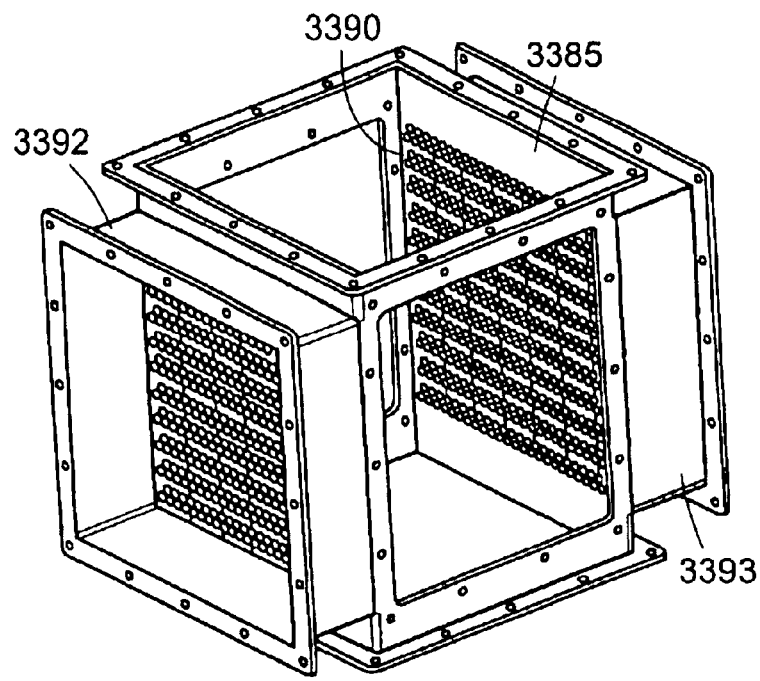
FIGS. 33A and 33B show a three-dimensional view of a fuel cell stack weldment having flanged fuel manifolds, in accordance with an embodiment of the invention.
Figure 33B:
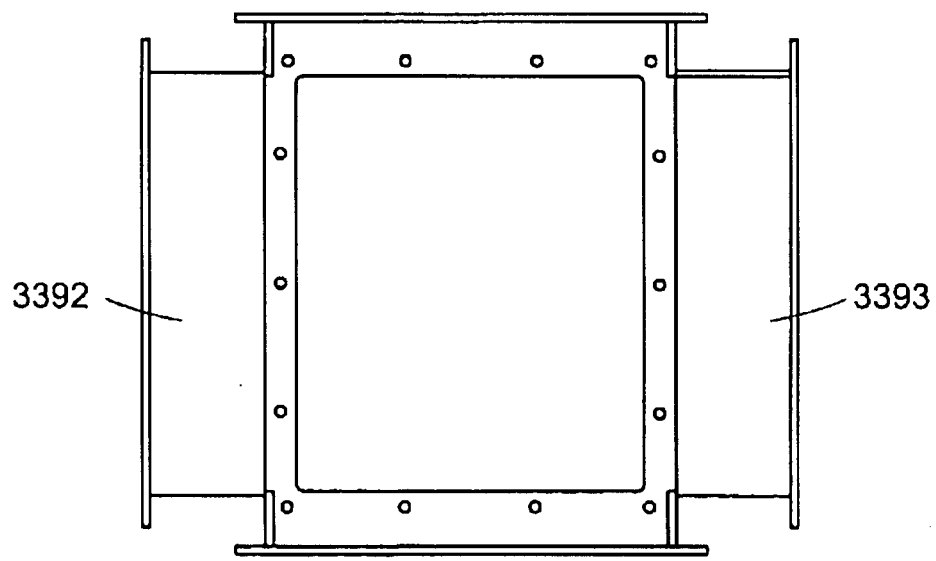
Figure 34:
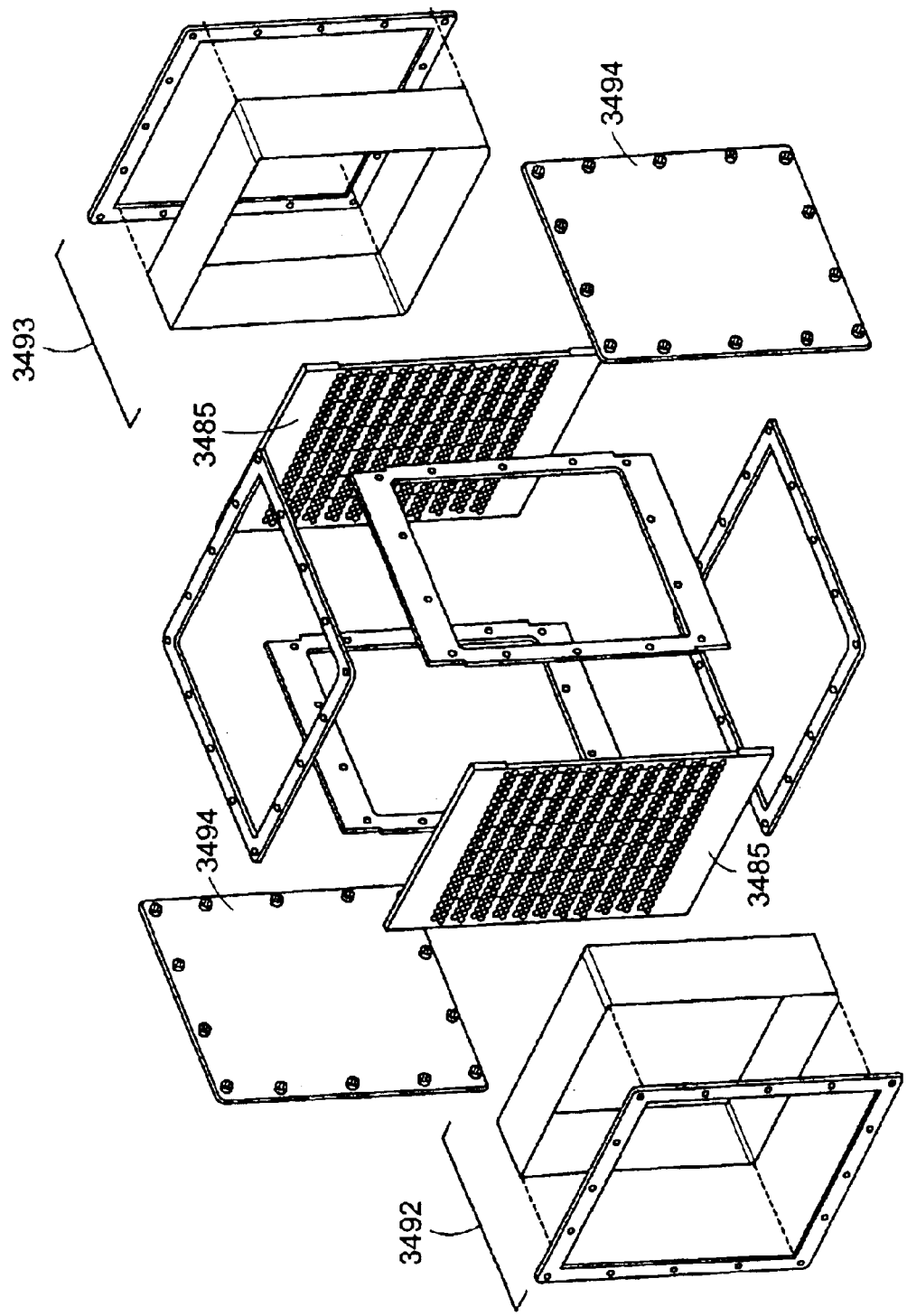
FIG. 34 shows an exploded view of the components of the stack weldment of the embodiment of FIGS. 33A and 33B.

FIGS. 33A, 33B, and 34 illustrate a fuel cell stack weldment in accordance with an embodiment of the invention, that may be used with both the dual injector system of FIG. 1 and the unidirectional flow system of FIG. 30, and with other embodiments described herein. As shown in FIGS. 33A and 33B, the stack weldment has two flanged fuel manifolds 3392 and 3393 attached to cell plates 3385. By securing manifold covers having inlet and outlet pipes (in a similar fashion to manifolds 3081 and 3082 of FIG. 30) to these flanges, the stack weldment may be used in a manner similar to the embodiment of FIG. 30 and other unidirectional flow embodiments. Alternatively, the stack weldment may be used with the dual injector embodiments described herein, with injectors (inside fuel cell tubes) extending through holes 3390.

The sealing technique of FIGS. 31 and 32 may also be used with the stack weldment of FIGS. 33A and 33B, in both unidirectional flow and dual injector versions. Cell plates 3385 each then function in an analogous way to cell plate 3185 of FIG. 31. FIG. 34 shows an assembly view of the weidment of FIGS. 33A and 33B, including cell plates 3485, flanged fuel manifolds 3492 and 3493, and side panels 3494. The flanges on four sides of the embodiment of FIGS. 33–34 facilitate bolting of the fuel cell stack to other components of a fuel cell system (such as the components of the embodiment of FIG. 35), and replacement of the stack component.

Figure 35:
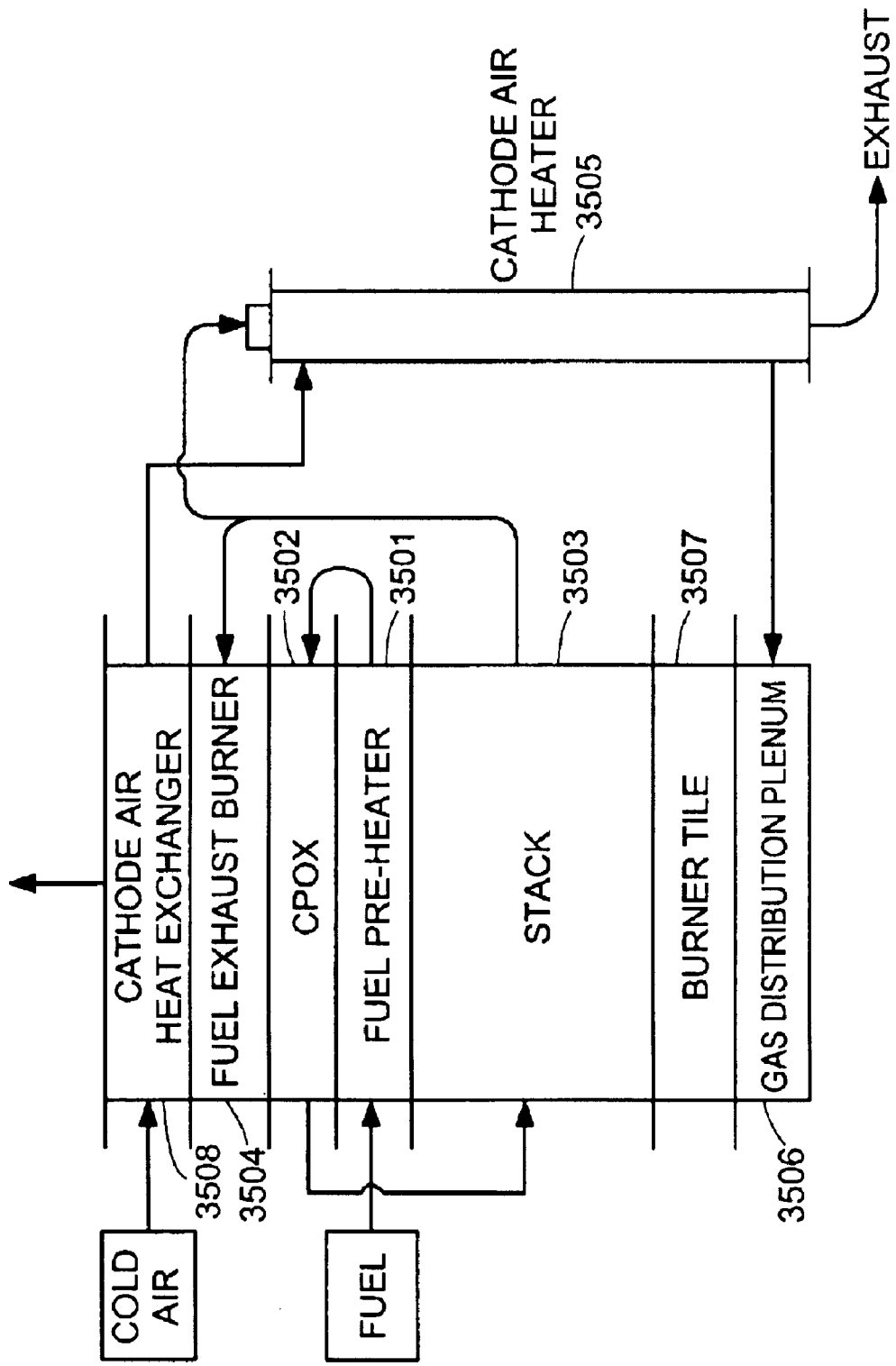
FIG. 35 shows a schematic representation of system components and gas flows in a fuel cell system according to an embodiment of the invention.

FIG. 35 shows an overall system design in accordance with an embodiment of the invention, that may be used with multiple fuel cell stack embodiments described herein. As noted with FIGS. 33A, 33B, and 34, a flange on each module of the system facilitates replacement of each module (for example, for maintenance or upgrading). Flow directions of air, fuel gas, and exhaust are indicated by arrows, in FIG. 35. Fuel gas enters the system through fuel pre-heater 3501, which may include heated metal coils. The heated fuel gas then enters CPOX reactor 3502, where the fuel gas is pre-reformed. The output gas of the CPOX reactor is then fed into the fuel gas inlet of the fuel cell stack 3503, where it passes through the fuel cells. The remaining fuel gas then flows out of the fuel cell stack, and is directed by ducts to both the fuel exhaust burner 3504 and the cathode air heater 3505. The output of the cathode air heater is fed to gas distribution plenum 3506. A ceramic plate burner tile 3507 is between the gas distribution plenum 3506 and the fuel cell stack 3503; the burner tile is perforated, and supports combustion. At start-up, some methane is added to the air, so that an igniter situated on the burner tile causes some combustion to occur. Cold air enters cathode air heat exchanger 3508, and the resulting hot air is fed to cathode air heater 3505. Exhaust leaves the system from cathode air heater 3505, and out the top of cathode air heat exchanger 3508.

FIGS. 36A, 36B, and 36C illustrate a technique for current collection from the anode of a tubular fuel cell, in accordance with an embodiment of the invention. In FIG. 36A, a conducting mesh 3609 is spot-welded to a conducting wire 3610, and pushed inside tubular fuel cell 3611, to make contact with the surface of the fuel cell's inner, anode layer. The mesh may be made, for example, of a silver/nickel alloy, or nickel, or silver. The wire is twisted to open out the mesh inside the fuel cell. Wire 3610 may be made, for example, of nickel or silver wire; and is connected to wires from other fuel cells by bus bars 3612, as shown in FIG. 36B. In FIG. 36B, two wires 3610 (shown from the rear) are electrically contacted by stainless steel bus bars 3612, which are compressed by bolt 3613 to make good electrical contact. Conducting mesh layers 3614 (of similar material to mesh 3609) may be placed between wires 3610 and bus bars 3612. As shown in FIG. 36C, more than two layers of bus bars 3612 and wires 3610 may be placed in electrical contact. The thickness T of the middle bus bar should be increased so that there is no stress on the upper and lower layers of fuel cells when the bus bars are bolted together.

Figure 37A:
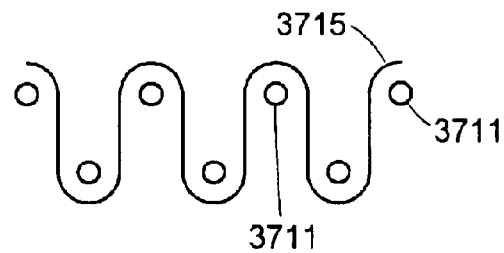
FIGS. 37A, 37B, and 37C show components for current collection from the cathode of a tubular fuel cell, in accordance with an embodiment of the invention.
Figure 37B:
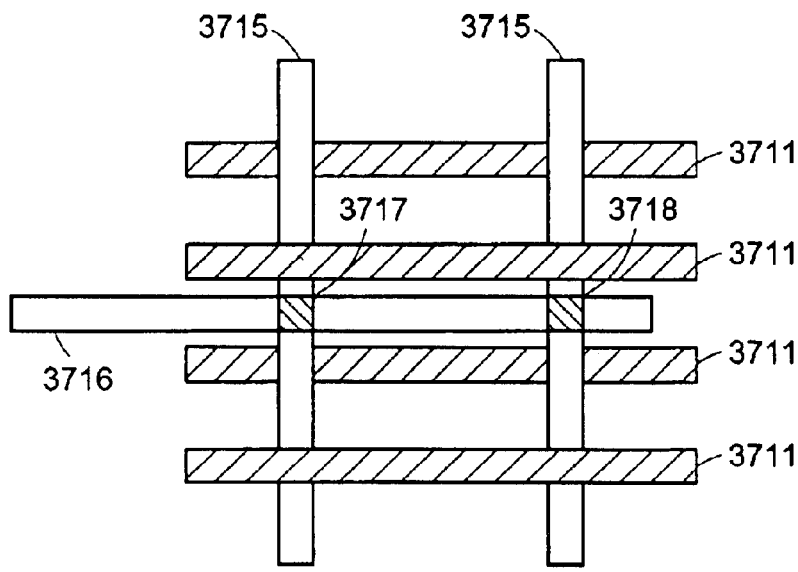
Figure 37C:
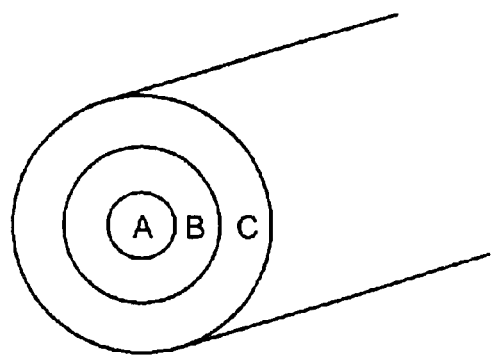

FIGS. 37A, 37B, and 37C illustrate a technique for current collection from the cathode of a tubular fuel cell, in accordance with an embodiment of the invention. As shown in FIG. 37A, a conducting mesh braid 3715 is woven around the outer, cathode surfaces of fuel cells 3711 (shown in cross-section). As shown in the top view of FIG. 37B, multiple such braids 3715 may be woven through fuel cells 3711, and a perpendicular braid or wire 3716 made to contact each of the multiple braids (for example at points 3717 and 3718). Alternatively, a mesh sheet may be placed over a whole row of cathodes, to increase the area over which current is collected.

In choosing materials for the meshes and wires of FIGS. 36A–36C and 37A–37C generally highly conductive, corrosion resistant materials are preferable. Melting points of materials are also an important consideration. Platinum or a platinum-group metal may be used; or silver alloys of nickel, in accordance with embodiments of the invention. Wires (such as wire 3716) may also be formed by cladding techniques, such as the cladding illustrated in FIG. 37C. Layer A in the wire of FIG. 37C is formed of copper (which is cheap, and a good conductor); layer B is formed of nickel, which provides a diffusion barrier; and layer C is formed of silver, which is oxidation resistant.

Figure 38:
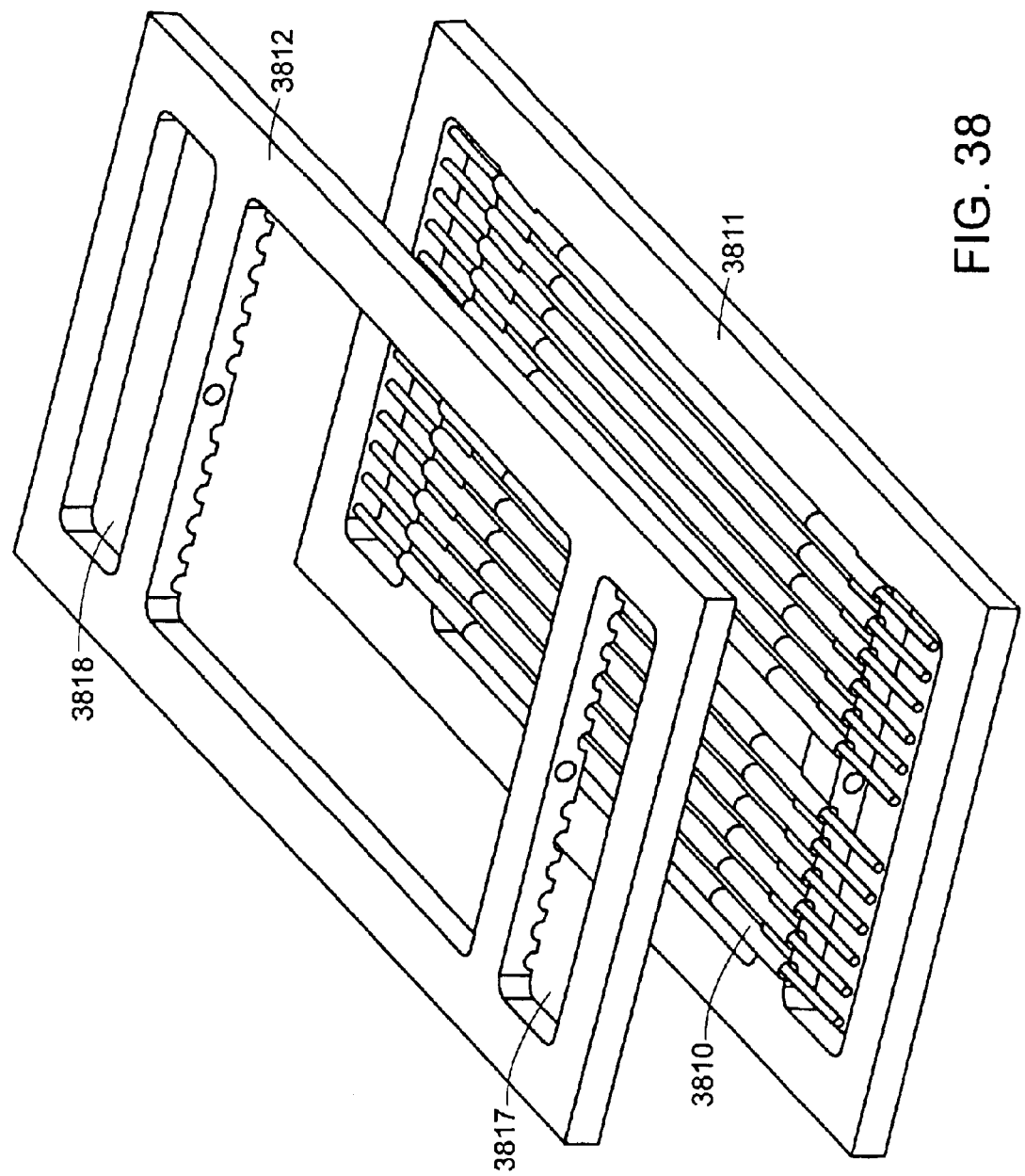
FIG. 38 shows a single layer of an all-ceramic fuel cell stack, according to an embodiment of the invention.

FIG. 38 shows a single layer of an all-ceramic fuel cell stack, according to an embodiment of the invention. Fuel cell tubes 3810 are glued into a bottom half 3811 of a ceramic manifold. A top half 3812 of the ceramic manifold is glued into a place on top of the bottom half 3811, sealing and sandwiching the tubes between. Fuel gas flows unidirectionally through fuel cells tubes 3810, with openings at one end of the ceramic manifold halves forming an inlet manifold 3817, and openings at the other end of the ceramic manifold halves forming an outlet manifold 3818.

Figure 39:
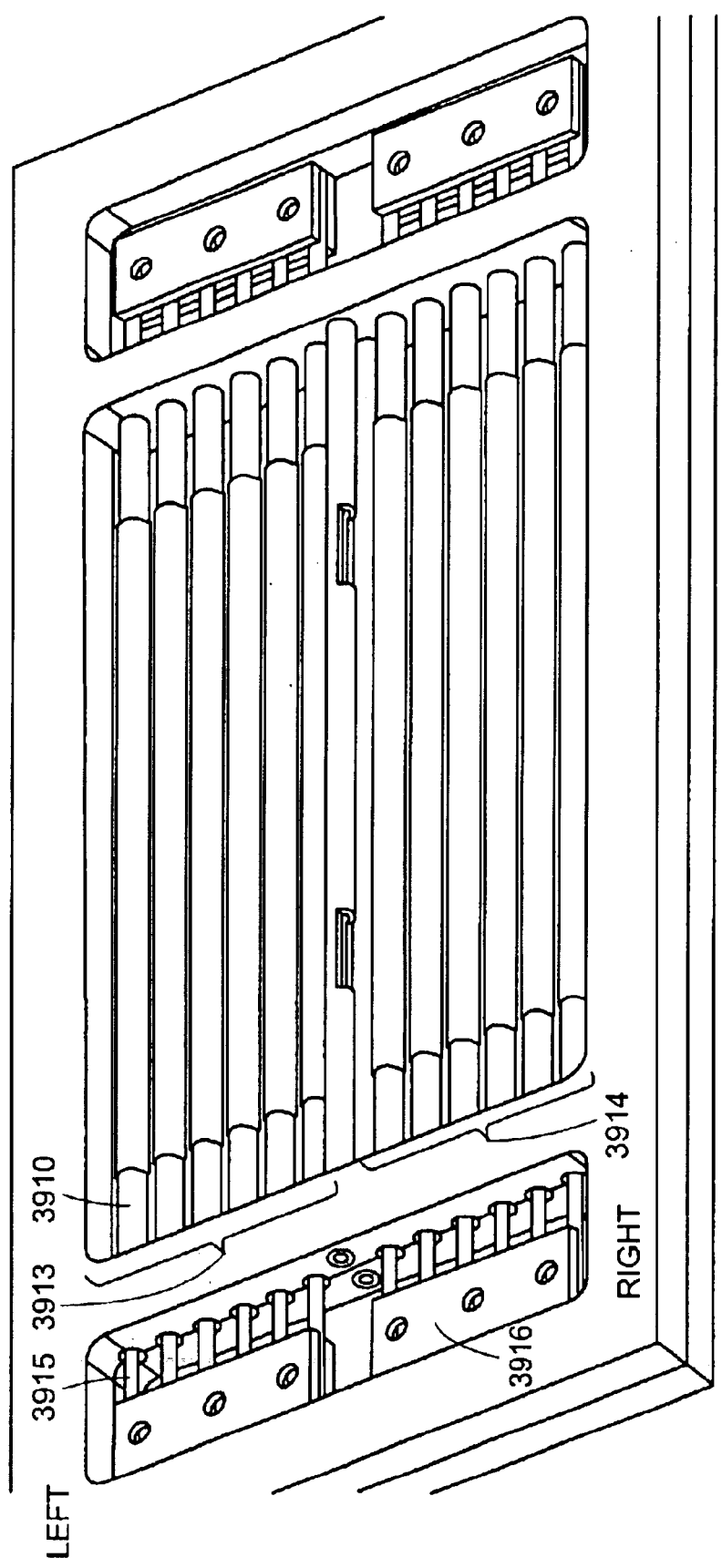
FIG. 39 shows an overall view of a current collection system for the embodiment of FIG. 38.

FIG. 39 shows an overall view of a current collection system for the embodiment of FIG. 38. Fuel cells 3910 of the layer are split into a left hand side bundle 3913 and a right hand side bundle 3914, which are connected in series. Anode wires 3915 and bus bars 3916 collect current from both ends of each six-cell bundle.

Figure 40:
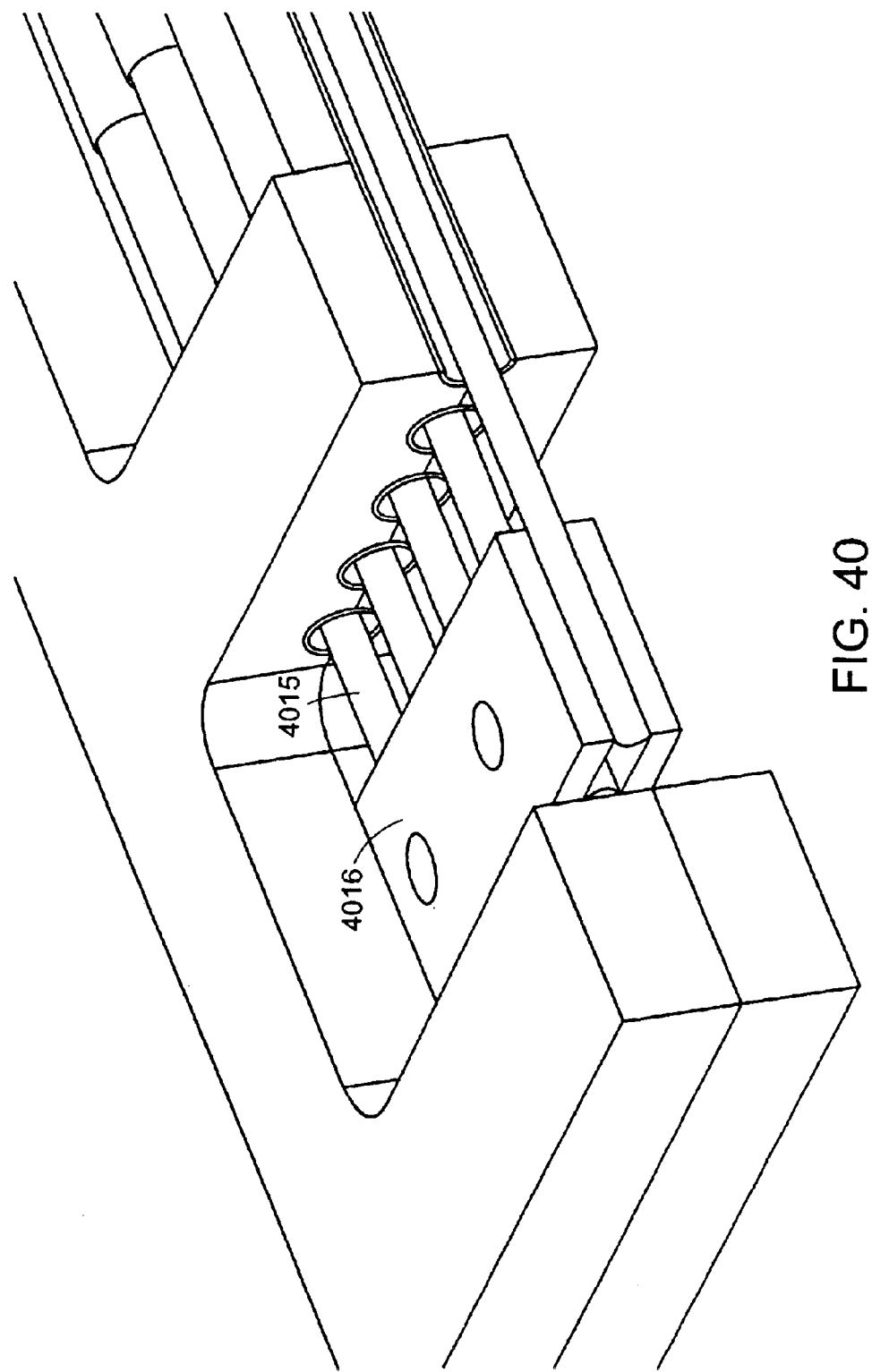
FIG. 40 shows a close-up view of the anode current collection system of the embodiment of FIG. 39.

FIG. 40 shows a close-up view of the anode current collection system of the embodiment of FIG. 39, with anode wires 4015 extending into bus bars 4016.

Figure 41:
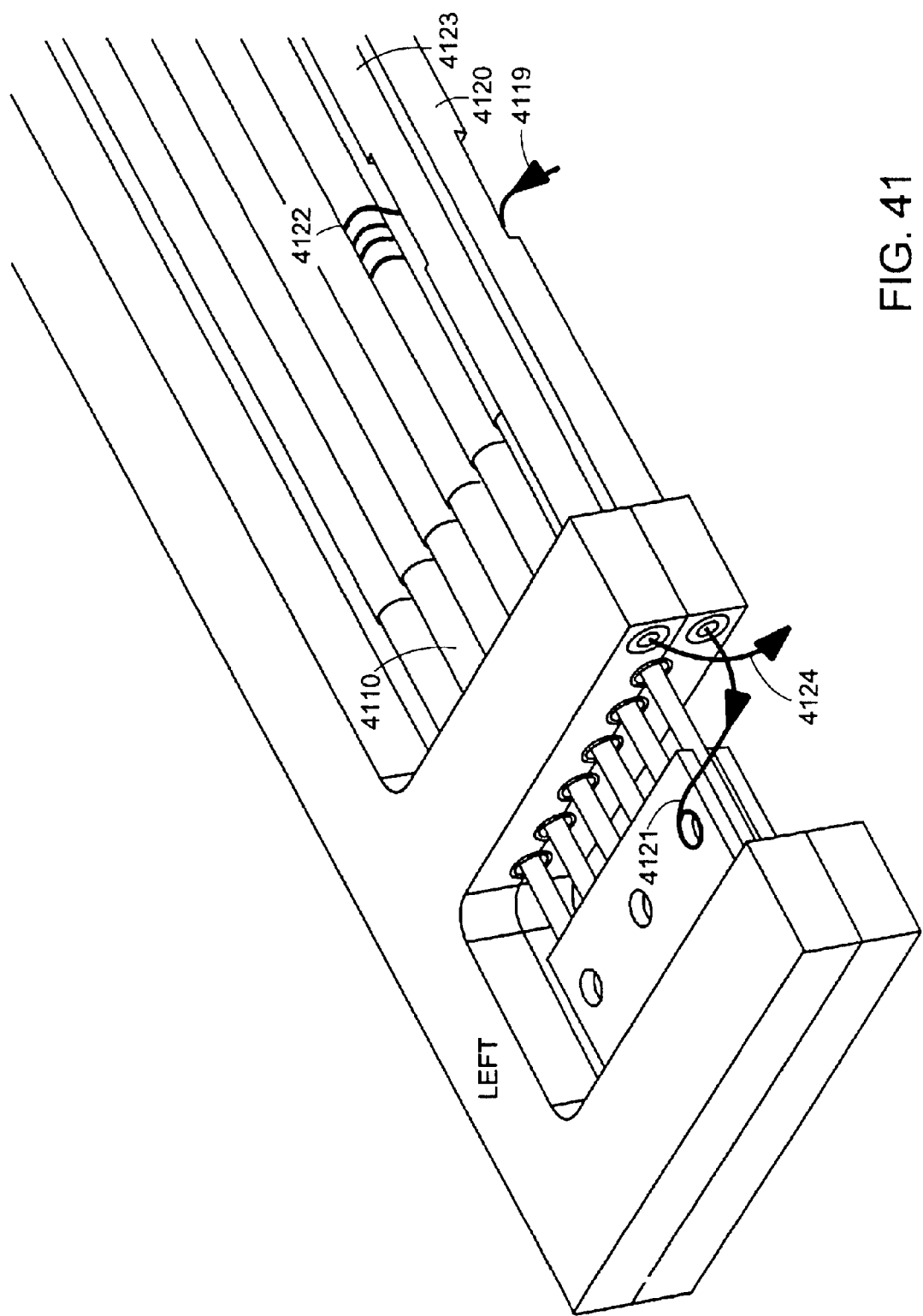
FIG. 41 shows the current path for the left hand side of one layer of the embodiment of FIGS. 38–40.

FIG. 41 shows the current path for the left hand side of one layer of the embodiment of FIGS. 38–40. A cathode current collector wire 4119 from the right hand side of the layer below passes up into a lower central ceramic tube 4120 that is used to insulate the wire, and travels to the end of the layer, where it is connected at 4121 to the left hand side anode bus bar 4116. The current passes through the left hand side fuel cells 4110 to the left hand side cathode current collection windings 4122, and into an upper central ceramic tube 4123. This wire travels to the end of the layer, where it is connected at 4124 to the right hand side anode bus bar (not shown). The current passes through the right hand side cells (not shown) to the right hand side current collection windings, and up into the lower central ceramic tube of the next layer above. The other end of the layer is a mirror image of the end shown in FIG. 41.

Figure 42:
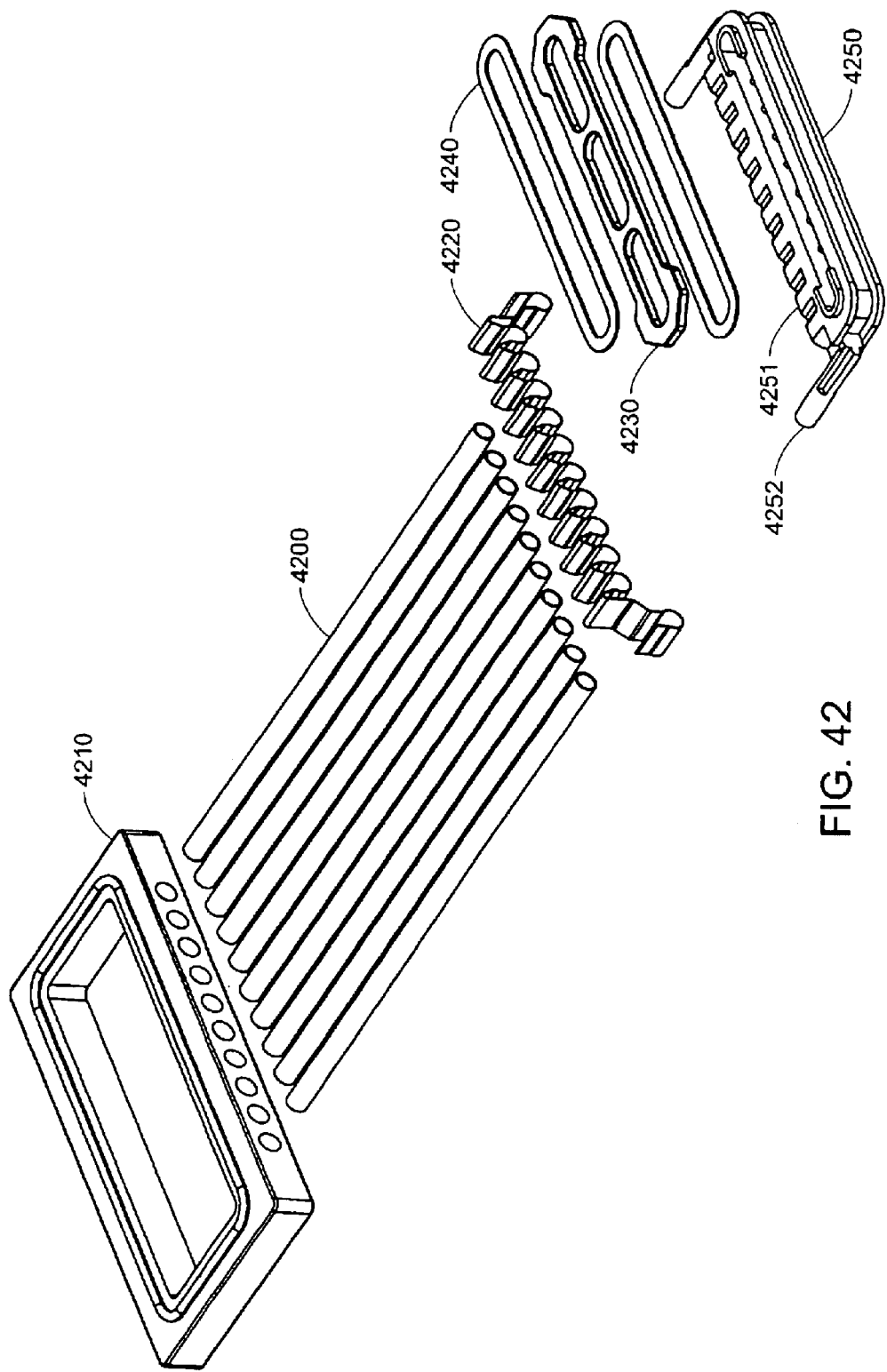
FIG. 42 shows an exploded view of a single layer of a layered fuel cell stack design, in accordance with an embodiment of the invention.

FIG. 42 shows an exploded view of a single layer of a layered fuel cell stack design, in accordance with another embodiment of the invention. Solid oxide fuel cell tubes 4200 extend horizontally through a ceramic exhaust plenum layer 4210. A corrugated-ribbon design current collector 4220, which may be made of silver-coated nickel or Inconel, makes a snap fit with the outer (cathode) layer of solid oxide fuel cell tubes 4200. Thermally and electrically insulating ceramic insulators 4230 are placed between layers of the fuel cell stack, as are gasket seals 4240, which are compressed to form a seal, and may be made, for example of mica. Fuel input manifold 4250 (made, for example, of nickel) contains projections 4251 through which fuel is input to the interior of the fuel cell tubes 4200, and also has projections 4252 for electrically connecting to the next stack layer above. In this fashion, each layer of fuel cell tubes 4200 is electrically in parallel, and is placed in series with the layers of tubes above and below it. Fuel cell tubes 4200 are brazed to the input manifold 4250.

Figure 43:
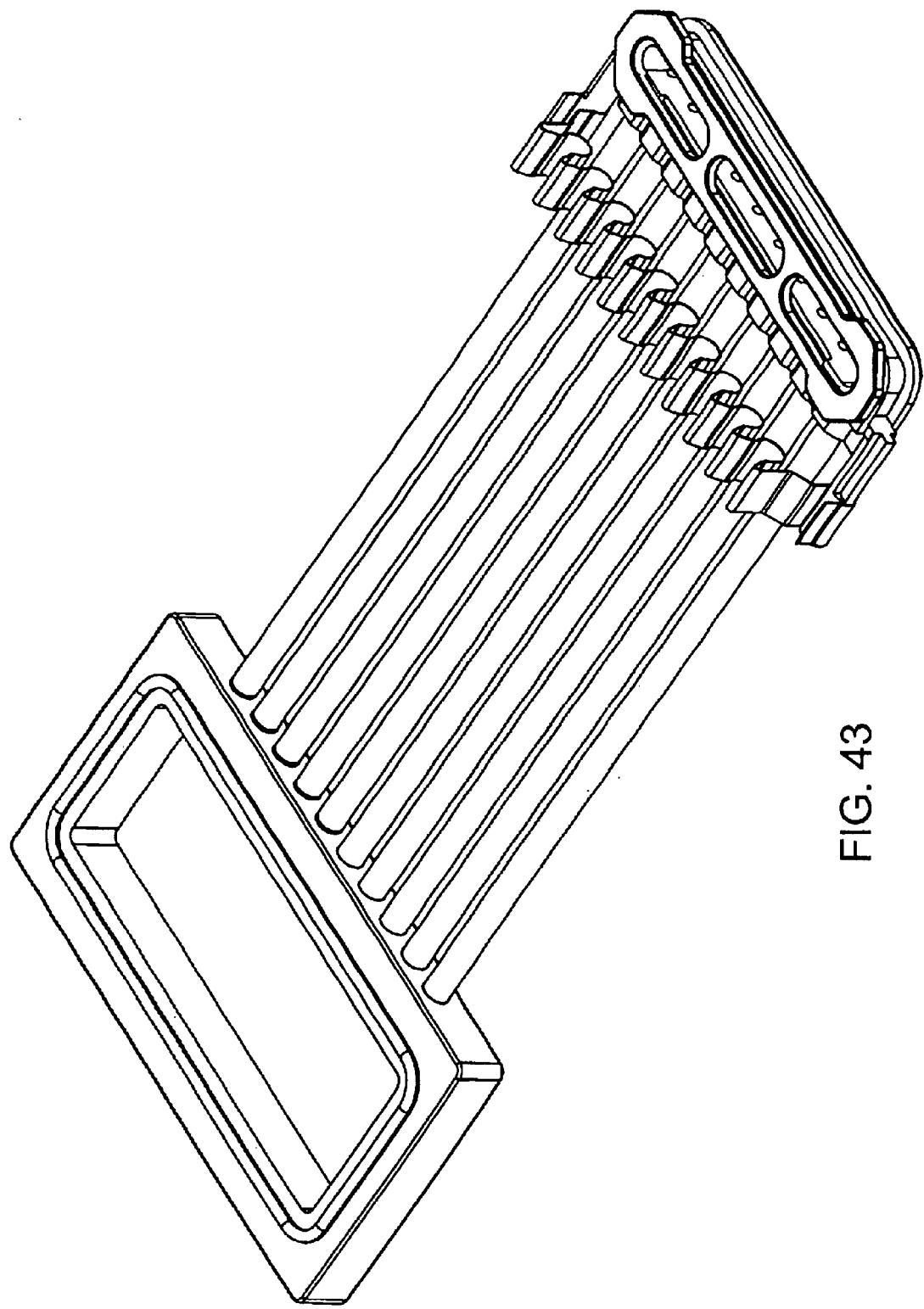
FIG. 43 shows an assembled view of the layer of FIG. 42.
Figure 44:
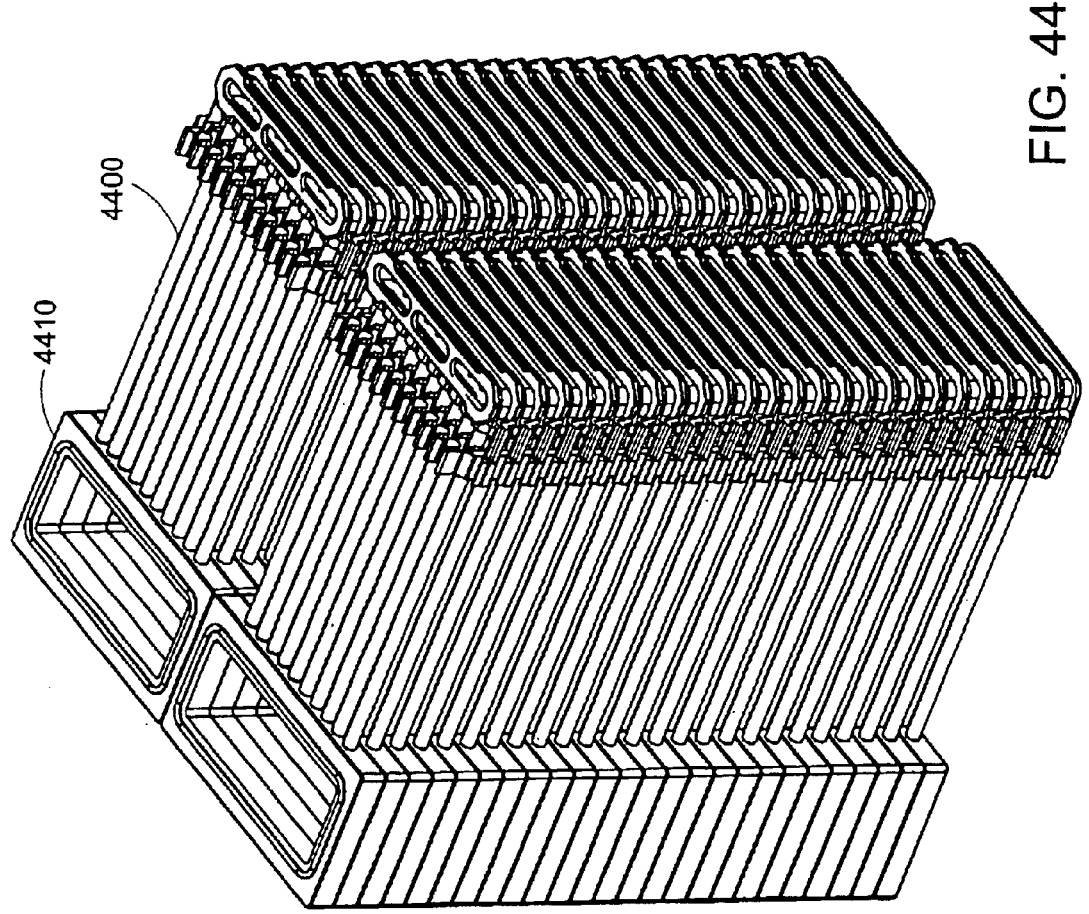
FIG. 44 shows several such layers formed into two stacks that are placed in series, in accordance with an embodiment of the invention.

FIG. 43 shows an assembled view of the layer of FIG. 42, and FIG. 44 shows several such layers formed into two stacks that are placed in series, in accordance with an embodiment of the invention. In FIG. 44, incoming air is pre-heated by the exhaust plenum end 4410 of the system, and then recirculates to flow over the outside (cathode) regions of cells 4400.

The layered stack design of the embodiment of FIGS. 42–44 allows for ease of manufacture.

Figure 45:
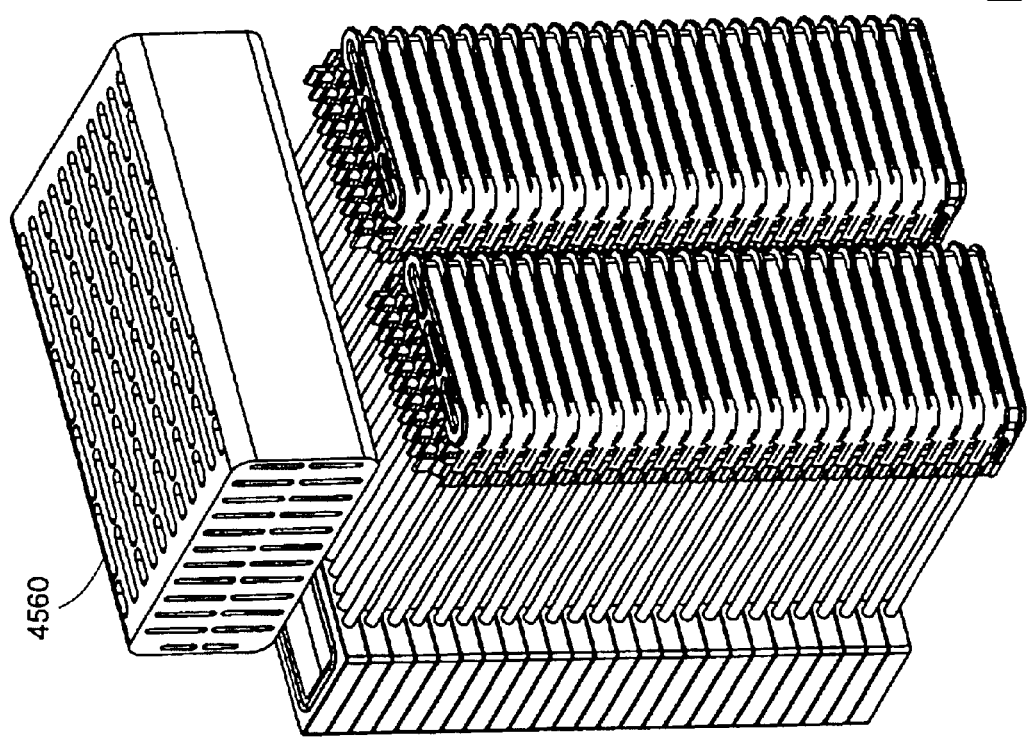
FIG. 45 shows two assembled stacks according to the embodiment of FIGS. 42–44, placed in series.

FIG. 45 shows two assembled stacks according to the embodiment of FIGS. 42–44, placed in series. A large heat exchanger 4560 overlies the region of outflowing air from the system. The heat exchanger 4560, which may be made of ceramic, stores heat from outgoing air from the system, and warms incoming air. Additionally, further heat exchange may be achieved, for example for household heating, by passing air or water pipes through the exhaust plenum 4410 (see FIG. 44), by which the air or water in the pipes will be heated.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A fuel cell system for generating electrical power, the system comprising:
   an open-ended tubular solid oxide fuel cell;
   a first fuel injector tube extending from a first fuel plenum chamber through one open end of the fuel cell; and
   a second fuel injector tube extending from a second fuel plenum chamber through another open end of the fuel cell;
   wherein the first and second fuel injector tubes form a gap within the fuel cell from which a hydrogen-containing fuel gas may flow towards the open ends of the fuel cell.

2. A system according to claim 1, wherein at least one of the fuel plenum chambers contains a pre-reformation catalyst.

3. A system according to claim 1, wherein the open ends of the fuel cell extend through first and second combustion manifolds bounding first and second combustion zones, and wherein the first fuel injector tube extends through the first combustion zone, and the second fuel injector tube extends through the second combustion zone.

4. A system according to claim 1, wherein the fuel cell is an anode-supported tubular fuel cell.

5. A system according to claim 1, wherein a bundle of a plurality of electrically-parallel tubular solid oxide fuel cells is mounted between an opposing pair of fuel plenum chambers, and opposing pairs of first and second fuel injector tubes extend into each fuel cell of the bundle.

6. A system according to claim 5, wherein a plurality of the bundles of fuel cells are electrically connected in series.

7. A system according to claim 6, wherein a plurality of adjoining fuel plenum chambers are electrically insulated by partitions.

8. A system according to claim 1, further comprising a ceramic heating tube.

9. A system according to claim 1, wherein at least one of the fuel plenum chambers comprises at least two oppositely-facing sets of fuel injector tubes.

10. A system according to claim 1, wherein a fuel inlet for the first fuel plenum chamber enters from an opposite side of the system from a fuel inlet for the second fuel plenum chamber.

11. A system according to claim 1, further comprising a gas burner positioned to heat an enclosure surrounding a cathode zone of the system.

12. A system according to claim 1, wherein the fuel cell comprises a plurality of fuel cell segments.

13. A system according to claim 1, wherein the first and second fuel injector tubes are electrically connected with an anode layer of the fuel cell.

14. A system according to claim 1, wherein a first combustion manifold forms a seal around the fuel cell.

15. A system according to claim 14, wherein the first combustion manifold is made of ceramic fiberboard, and wherein the seal is formed by compressing the ceramic fiberboard.

16. A system according to claim 15, wherein a stack of a plurality of layers of electrically-parallel fuel cell bundles are electrically insulated from each other.

17. A system according to claim 16, wherein ceramic fiber blanket material electrically insulates the layers.

18. A system according to claim 15, wherein the first combustion manifold is separated into two combustion zones.

19. A system according to claim 18, wherein the two combustion zones correspond to electrically insulated halves of the first fuel plenum chamber.

20. A fuel cell system for generating electrical power, the system comprising:
    a plurality of open-ended tubular solid oxide fuel cells positioned horizontally between a fuel inlet plate and a fuel outlet plate;
    wherein the fuel inlet plate and the fuel outlet plate comprise a series of openings for the fuel cells, and each comprise a compressed layer of ceramic fiberboard that forms a seal around each of the fuel cells.

21. A fuel cell system according to claim 20, further comprising a gas burner positioned to heat an enclosure surrounding a cathode zone of the system.

22. A fuel cell system according to claim 20, further comprising a fuel pre-treatment module.

23. A fuel cell system according to claim 20, wherein the fuel inlet plate and fuel outlet plate comprise flanges for modular assembly of the fuel cell system.

24. A fuel cell system for generating electrical power, the system comprising:
    a plurality of vertically-stacked fuel cell layers, each layer comprising a plurality of open-ended tubular solid oxide fuel cells positioned horizontally between two ceramic fiberboard fuel plenums and placed electrically in parallel;
    wherein each layer of the plurality of layers is electrically insulated from neighboring layers.

25. A method of forming a seal around a tubular solid oxide fuel cell, the method comprising:
    inserting the fuel cell through at least three seal layers, the seal layers comprising first and second metal plate layers and a ceramic fiberboard layer; and
    compressing the ceramic fiberboard layer between the metal plates to form a seal around the fuel cell.

26. A fuel cell system for generating electrical power, the system comprising:
    a plurality of open-ended tubular solid oxide fuel cells positioned horizontally between a top half and a bottom half of a ceramic manifold;

wherein the ceramic manifold forms a seal around the ends of the fuel cells, and wherein an opening at one end of the ceramic manifold forms an inlet manifold, and an opening at the other end of the ceramic manifold forms an outlet manifold.

27. A fuel cell system according to claim 26, wherein the ceramic manifold comprises openings for a plurality of bundles of electrically parallel fuel cells.

28. A fuel cell system according to claim 27, wherein at least two bundles of fuel cells within the ceramic manifold are electrically connected in series.

29. A fuel cell system according to claim 28, wherein an anode current collection system of the fuel cell system comprises a set of anode wires sandwiched between a pair of bus bars.

30. A fuel cell system according to claim 29, further comprising at least one ceramic tube surrounding a current collection wire.

31. A fuel cell system for generating electrical power, the system comprising:

a plurality of vertically-stacked fuel cell layers, each layer comprising a plurality of open-ended tubular solid oxide fuel cells positioned horizontally between a ceramic exhaust plenum and a metal fuel input manifold;

wherein the fuel input manifold comprises projections for electrically connecting each fuel cell layer to a next layer above it, and wherein a corrugated current collector for each layer makes a snap fit with the plurality of fuel cells of the layer.

32. A system according to claim 31, further comprising a heat exchanger positioned to store heat from outgoing air from the system and to warm incoming air.

33. A system according to claim 31, further comprising at least one heating pipe extending through the exhaust plenum.

* * * * *